July 14, 1953 I. O. MOBERG 2,645,250
PATTERN CONTROLLED VARIABLE BEAT-UP
AND PILE WARP FEED MECHANISMS
Filed Sept. 22, 1950 11 Sheets-Sheet 1

IVAR O. MOBERG,
INVENTOR.

BY Eaton & Bell
ATTORNEYS.

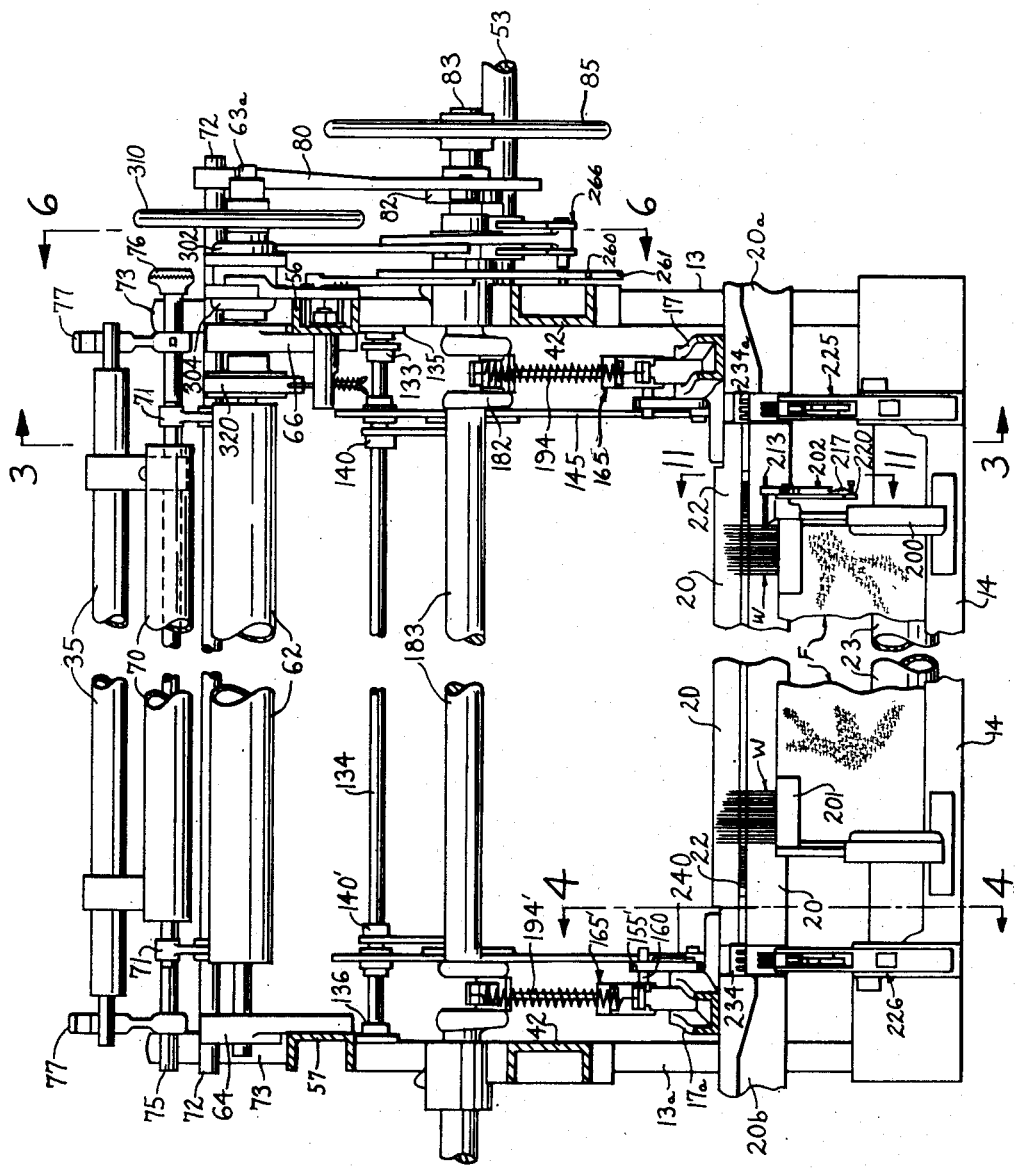

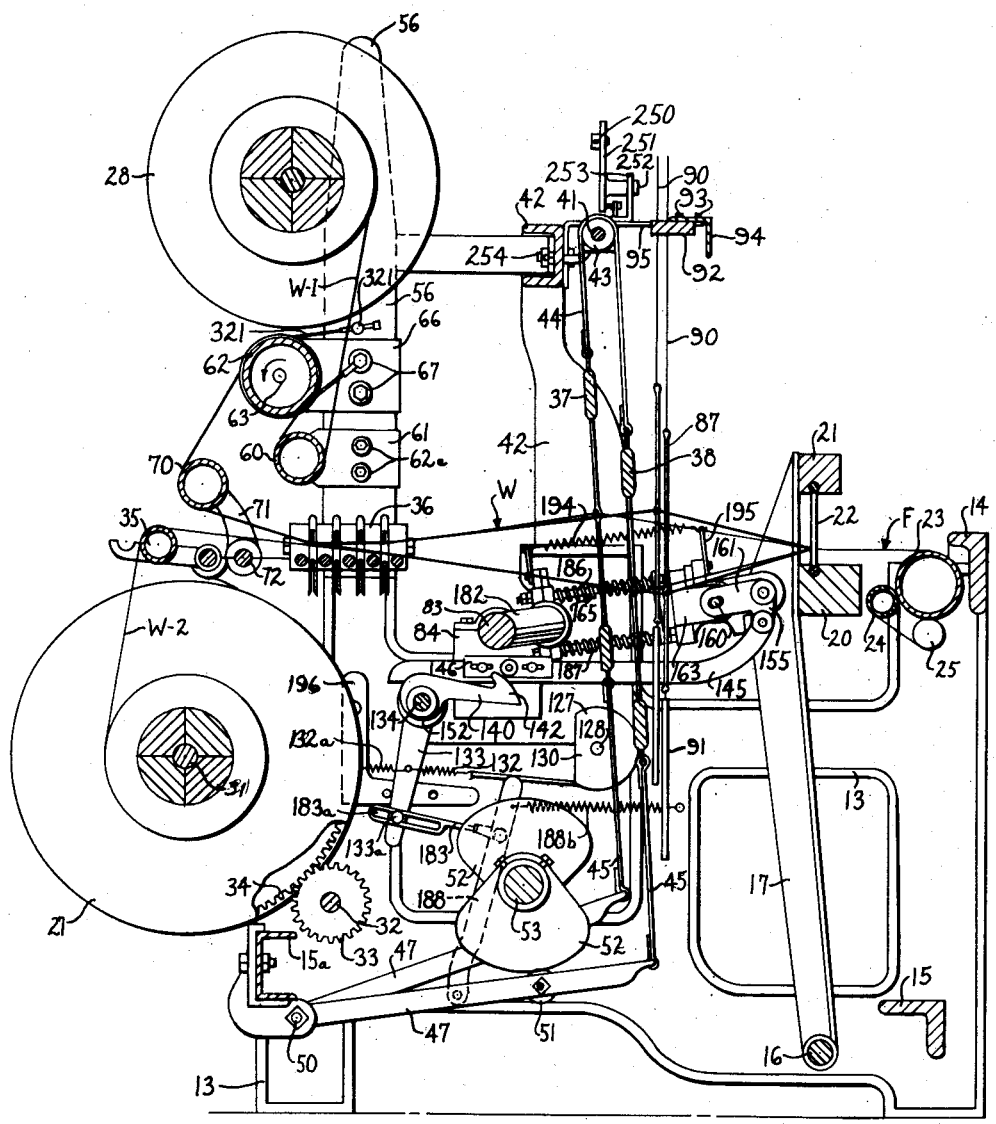

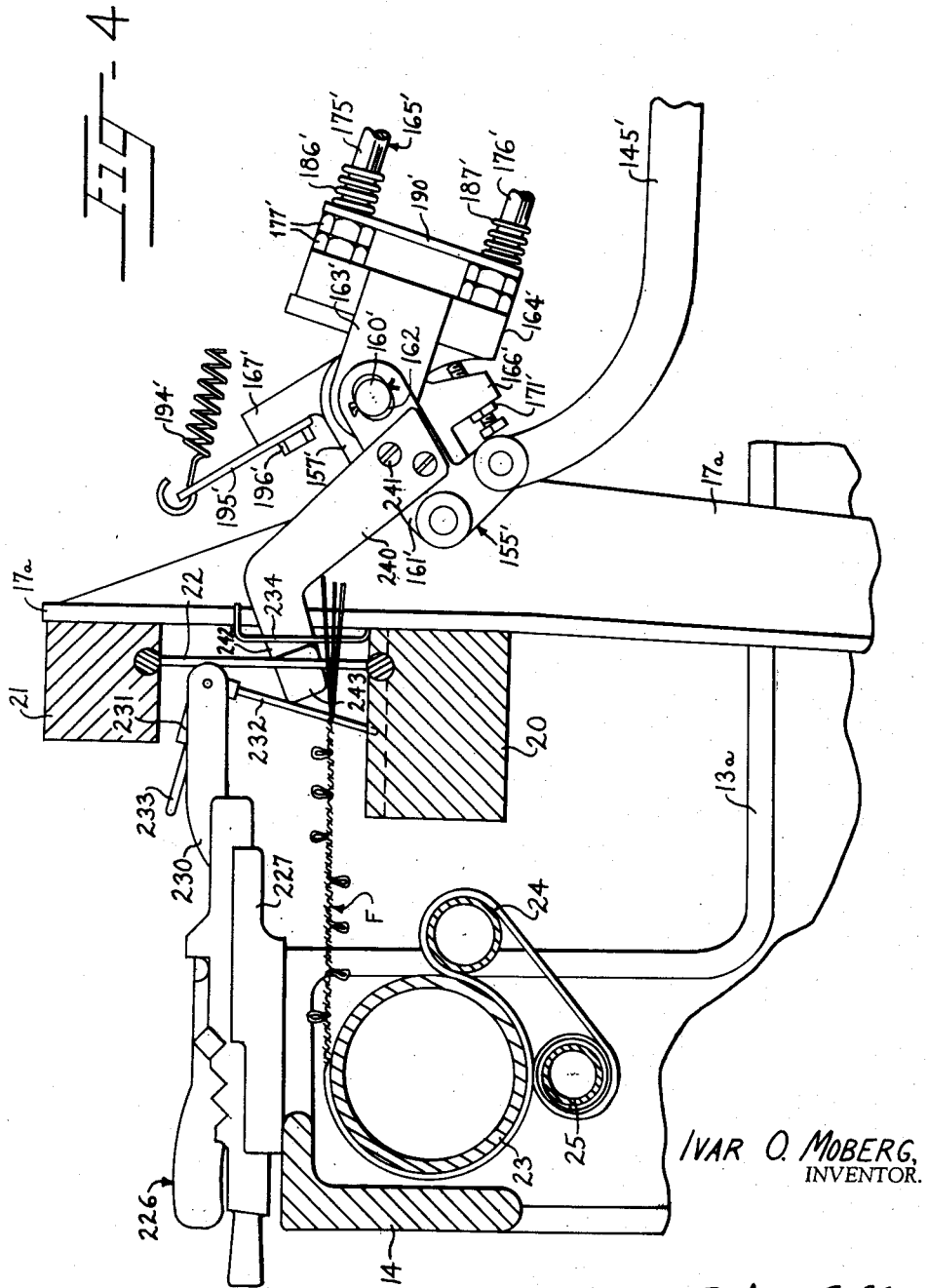

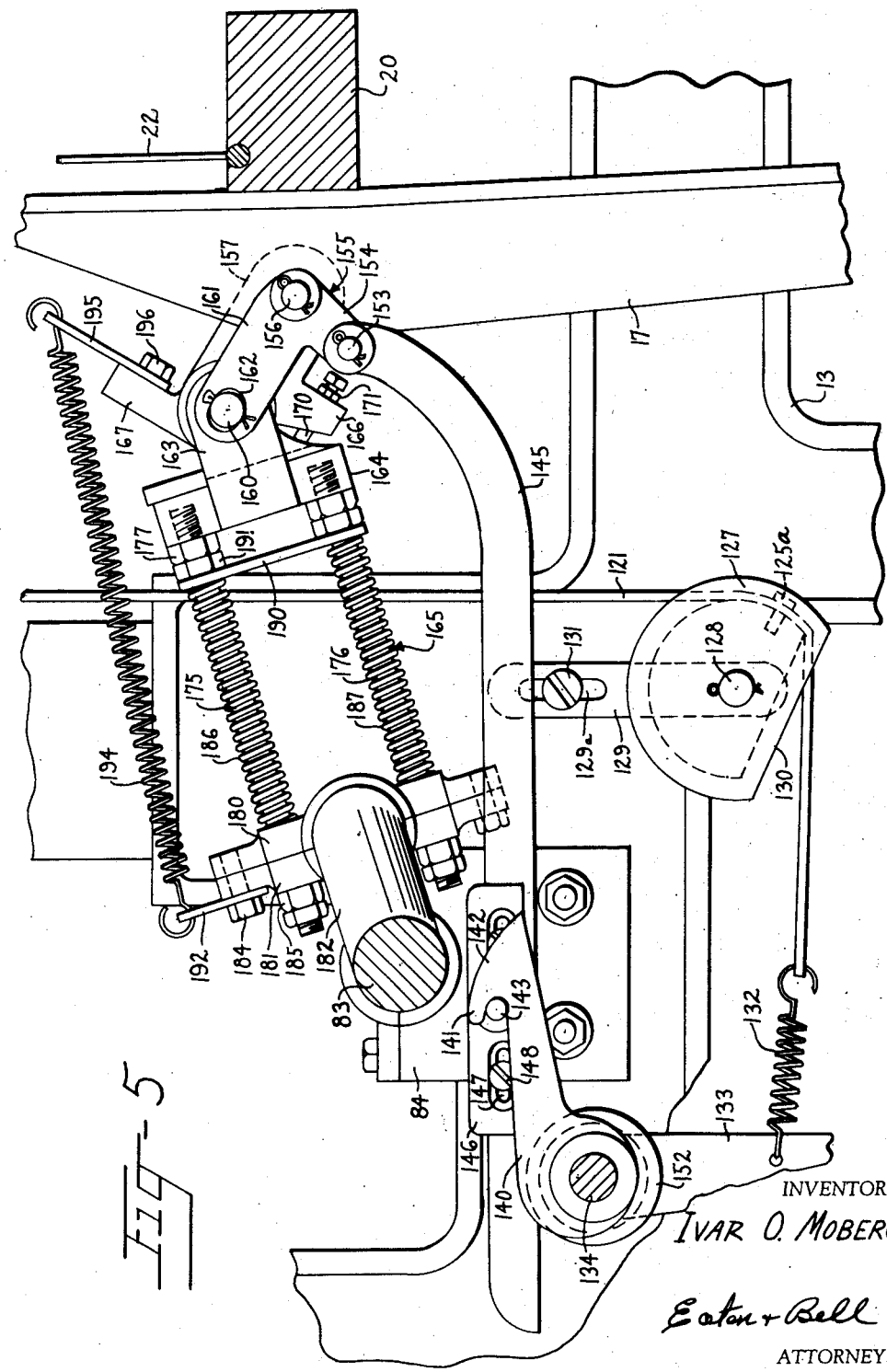

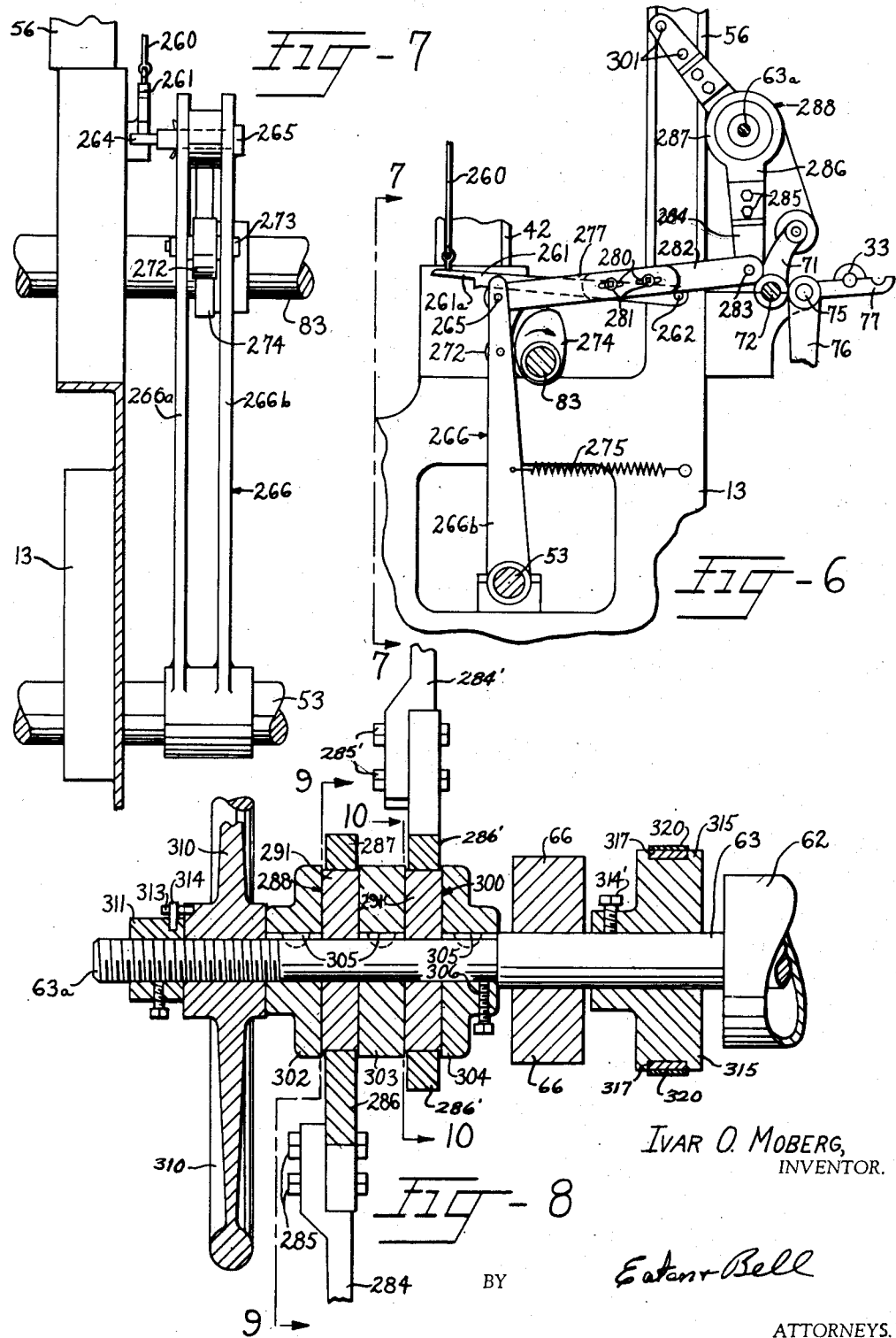

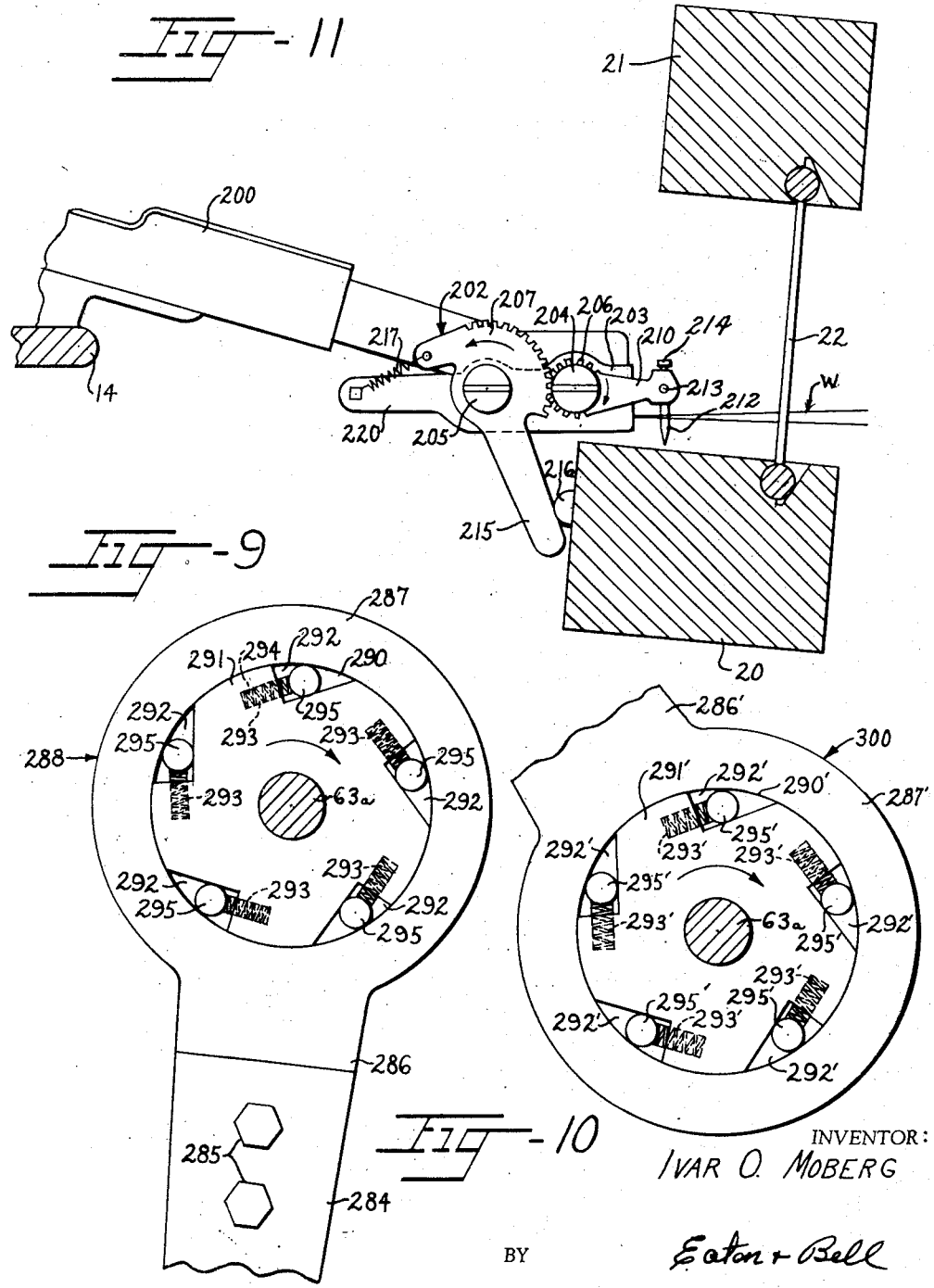

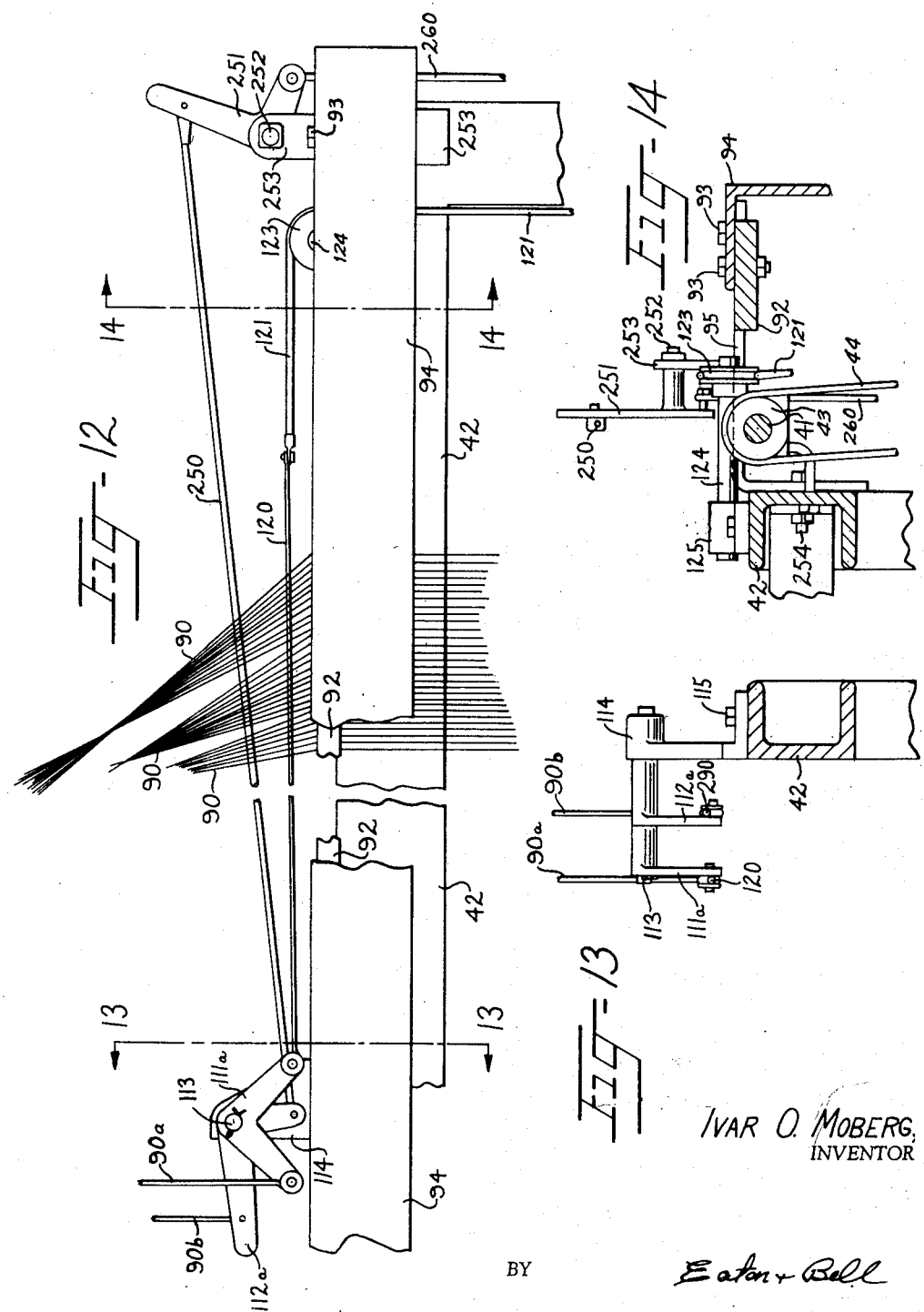

July 14, 1953  I. O. MOBERG  2,645,250
PATTERN CONTROLLED VARIABLE BEAT-UP
AND PILE WARP FEED MECHANISMS
Filed Sept. 22, 1950  11 Sheets-Sheet 9

INVENTOR:
IVAR O. MOBERG.
BY
Eaton + Bell
ATTORNEYS.

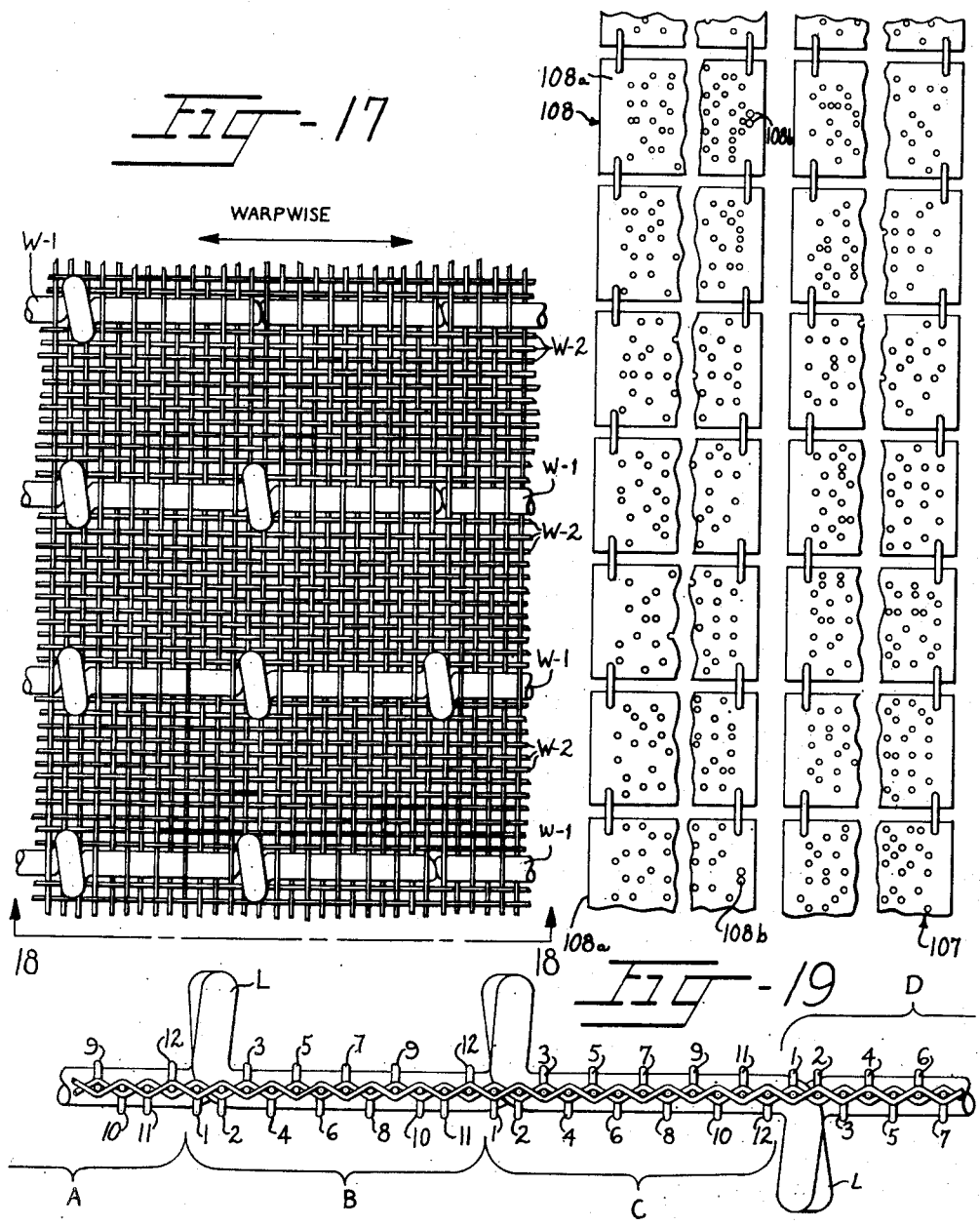

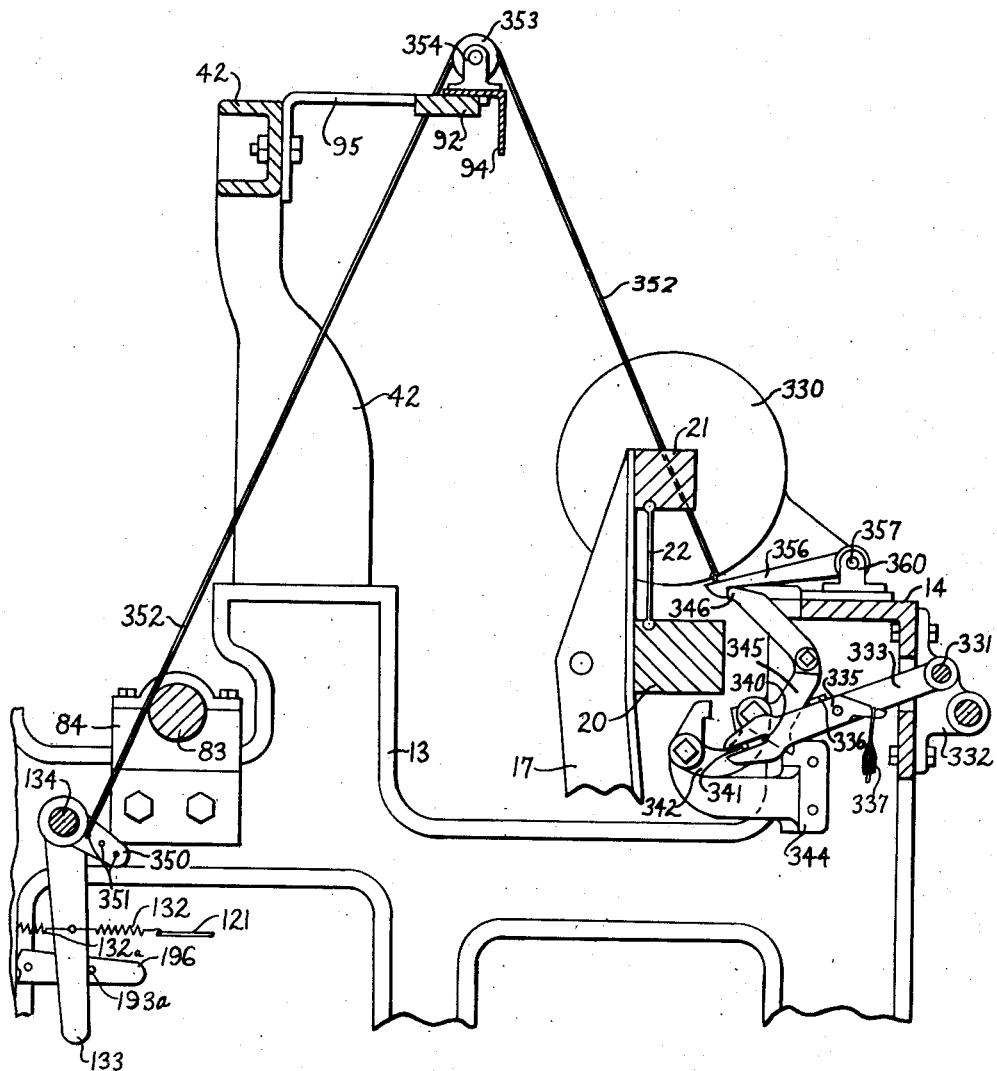

Patented July 14, 1953

2,645,250

UNITED STATES PATENT OFFICE 2,645,250

PATTERN CONTROLLED VARIABLE BEAT-UP AND PILE WARP FEED MECHANISMS

Ivar O. Moberg, Spray, N. C., assignor to Marshall Field and Company, Chicago, Ill., a corporation of Illinois Application September 22, 1950, Serial No. 186,182

10 Claims. (Cl. 139—25)

1

This invention relates to textile machinery and more especially to improved pattern controlled variable beat-up and pile warp feed mechanisms for looms.

It is the primary object of this invention to provide means associated with a loom for producing terry fabrics wherein a plurality of variously spaced terry loops may project from opposed faces of the woven fabric, the terry loops being arranged according to a desired pattern for purposes of ornamentation.

It is another object of this invention to provide improvements in a loom for weaving fabrics having loops thereon which are spaced according to a desired pattern and including improved pattern controlled means for varying the length of the beat-up stroke of the lay of the loom at predetermined intervals and also providing coacting pattern controlled means operable simultaneously with the first-named pattern controlled means for feeding a greater amount of yarn from the loop warp beam than is fed from the basic warp beam so that in the course of weaving during three beat-up strokes of the lay and in which the second beat-up stroke is shorter than the first and third beat-up strokes a loop will be formed of each of the loop warp yarns as a result of the extra length of loop warp being supplied to the lay with respect to the length of the basic warp, this extra supply of loop warp being provided immediately following the short beat-up stroke and during the third of said three beat-up strokes of the lay. Therefore, upon the third beat-up stroke, which is of normal length, the slack in the pile warp yarns will be beat-up and the third pick or beat-up stroke of the lay will also cause the preceding or second pick to be beat-up against the first pick.

Some of the objects of the invention having been stated, other objects will appear as the description proceeds when taken in connection with the accompanying drawings in which—

Figure 2 is a top plan view with the central portions thereof broken away and with other parts in section and is taken substantially along the line 2—2 in Figure 1;

Figure 3 is a longitudinal vertical sectional view through the loom taken substantially along the line 3—3 in Figure 2;

Figure 4 is an enlarged fragmentary vertical

Figure 1:
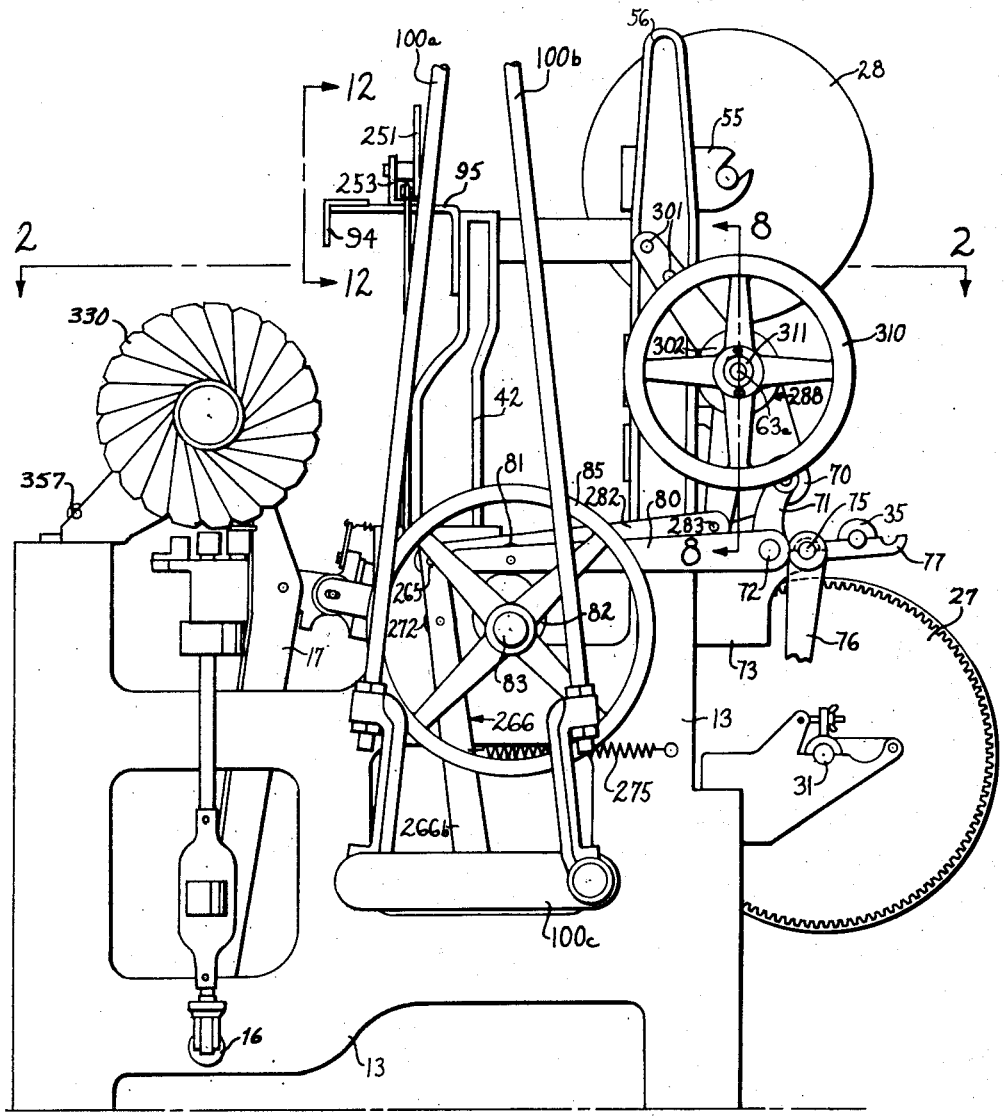
Figure 1 is an elevation looking at the right-hand side of the loom with which a jacquard mechanism is adapted to be associated and also showing the improved terry fabric weaving apparatus in association therewith.
Figure 16:
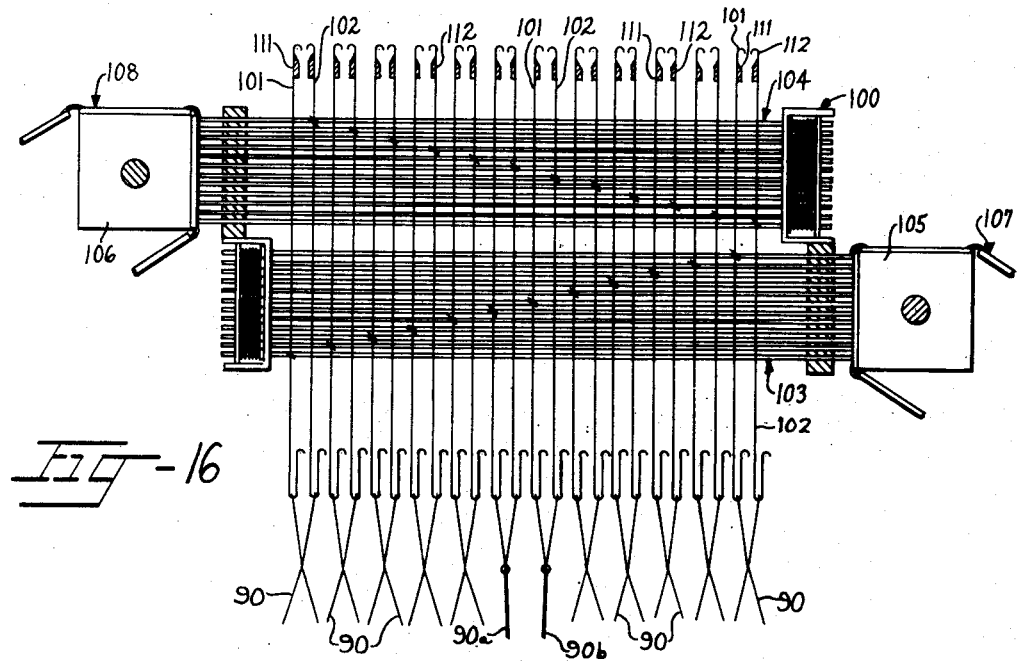
Figure 15:
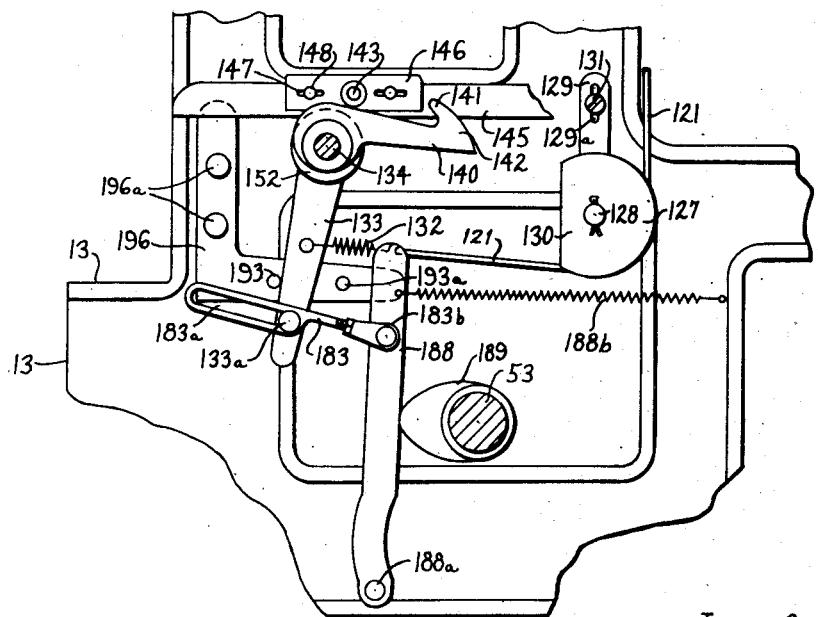

2 sectional view showing an improved means for actuating the conventional filling fork of the loom during a short stroke of the lay to prevent the loom from stopping unintentionally, and being taken substantially along the line 4—4 in Figure 2;

Figure 5 is an enlarged fragmentary elevation of the central portion of Figure 3, Figure 3 showing the pitman rod in condition for effecting a normal length stroke of the lay and Figure 5 showing the pitman rod in condition for effecting a shorter than normal length of stroke to the lay;

Figure 6 is a fragmentary elevation, with parts in section, taken substantially along the line 6—6 in Figure 2 and showing the means for slackening the loop warp in operative position, this means for slackening the loop warp being shown in inoperative position in Figure 1;

Figure 7 is a fragmentary elevation with a portion of the loom frame in cross-section, looking substantially along the line 7—7 in Figure 6;

Figure 8 is an enlarged vertical sectional view with parts broken away taken substantially along the line 8—8 in Figure 1 and showing the overriding clutch means associated with the roll for slackening the tension in the loop warp yarns momentarily;

Figure 9 is an enlarged elevation with a shaft in section showing a driving overriding clutch mechanism associated with the terry warp feed control roll and being taken substantially along the line 9—9 in Fig. 8;

Figure 10 is an enlarged elevation of the locking clutch mechanism showing the shaft in cross-section and being taken substantially along the line 10—10 in Figure 8;

Figure 11 is an enlarged schematic fragmentary elevation with parts in section taken substantially along the line 11—11 in Figure 2 and showing means for holding the pick in parallel relation to the reed during a relative short beat-up stroke of the lay;

Figure 12 is an enlarged fragmentary elevation with parts broken away looking substantially along the line 12—12 in Figure 1;

Figure 13 is a fragmentary elevation showing the arch of the loom in cross-section and looking substantially along the line 13—13 in Figure 12;

Figure 14 is a vertical sectional view taken along the line 14—14 in Figure 12;

Figure 15 is an enlarged view of the lower central portion of Figure 3 but showing the parts in a different position;

Figure 16 is a schematic showing of a jacquard which serves as the pattern medium of the present invention;

Figure 17 is an enlarged fragmentary elevation showing a piece of fabric as woven on a loom with which the present improved apparatus is associated;

Figure 18 is a fragmentary view looking at the lower edge of the piece of fabric shown in Figure 17;

Figure 19 is a schematic elevation showing a few of the series of pattern cards associated with the jacquard mechanism of Figure 16 for producing the particular type of fabric shown in Figures 17 and 18;

Figure 20 is an enlarged fragmentary view similar to the upper right-hand portion of Figure 3 with many of the parts omitted and other parts being shown schematically, and also showing a means for preventing a bobbin transfer operation from taking place in an automatic loom upon a relatively short beat-up stroke of the lay in the event of the usual transfer mechanism having been conditioned for a transfer operation to take place during a relatively short beat-up stroke of the lay.

Referring more specifically to the drawings, the numerals 13 and 13a indicate the right-hand and the left-hand side frame members of a loom, respectively, which are bridged at their front upper and lower ends by a breast beam 14 and a front lower girt 15, these side frame members 13 and 13a also being bridged by a rear girt 15a. The girts 15 and 15a and the breast beam 14 are suitably secured to the loom side frames 13 and 13a in a conventional manner. The particular type of loom shown in the drawings is the type such as is manufactured by Draper Corporation and which is commonly known as their model O loom. However, it is to be understood that the present apparatus may be associated with many other types of looms.

The loom includes a conventional rocker shaft 16 oscillatably mounted at opposed ends thereof in the loom side frame members 13 and 13a and on which the lower ends of a pair of spaced swords 17 and 17a are fixedly mounted. The swords 17 and 17a extend upwardly in Figures 1 and 3 and have a conventional lay 20 and a reed cap 21 suitably secured thereto, between which a conventional reed 22 extends. The swords 17 and 17a have means peculiar to the present invention connected thereto for imparting forward and rearward oscillation thereto which will be later described in detail. Warp yarns generally designated at W are directed to the reed 22 and these warp yarns W cooperate with the usual pick yarns for producing a fabric broadly designated at F. The fabric F extends forwardly from the reed 22, in Figure 3, to a suitable cloth take-up mechanism which is shown in Figure 3 in the form of a sand roll 23, an idler roll 24 and a take-up roll 25, all of which are driven in a conventional manner for taking up on the fabric F upon each beat-up stroke of the lay 20.

The warp yarns W extend from a basic warp beam 27 and a loop warp beam 28, the loop warp yarns from the warp beam 28 being indicated at W-1 and the basic warp yarns extending from the basic warp beam 27 being indicated at W-2. The basic warp beam 27 is rotatably mounted at opposed ends thereof, as at 31, on the rear portions of the loom side frames 13 and 13a and has the usual friction or other types of let-off mechanism associated therewith which, in this instance, includes a shaft 32 having a let-off pinion 33 fixed thereon which meshes with a beam gear 34 for letting off the desired amount of warp yarns W-2 in accordance with the beat-up strokes of the lay 20. The warp yarns W-2 extend upwardly in Figure 3 and pass over a suitable whip roll 35 and then through a suitable drop-wire stop motion, generally designated at 36, after which the warp yarns W-2 merge with the warp yarns W-1 to form the sheets of warp W. The warp yarns W-2 extend through conventional harnesses 37, 38 which are mounted for up and down movement relative to each other.

This particular type of loom has an idler shaft 41 mounted for oscillation on a conventional arch 42 of the loom, this arch 42 extending downwardly at opposed ends thereof and being suitably secured to the loom side frames 13 and 13a. The shaft 41 has suitable pulleys or rollers 43 fixed thereon, only one of which is shown in Figure 3, which are engaged by the medial portions of harness straps 44, opposed ends which extend downwardly and are connected to the respective harnesses 37 and 38. The lower ends of the harnesses 37 and 38 each have a rod 45 connected thereto and extending downwardly therefrom, the lower end of which is connected to the free end of a treadle 47.

These treadles 47 extend rearwardly and are pivotally connected, as at 50, to the rear girt 15a. Each of the treadles 47 has a treadle roll 51 rotatably mounted therein which is adapted to be engaged by a cam 52. The cams 52 are fixedly mounted on the usual driven cam shaft 53 suitably supported at opposed ends thereof for rotation on the loom side frame members 13 and 13a.

The loop warp beam 28 is mounted for rotation at opposed ends thereof in suitable bearings 55, only one of which is shown secured to the proximate surfaces of side frame extensions 56 and 57 (Figure 2) which extend downwardly and the lower ends of which are suitably secured to the respective loom side frame members 13 and 13a. This loop warp beam 28 is provided with a usual type of friction mechanism, not shown, for resisting rotation thereof, and in their course to the harnesses, the loop warp yarns W-1 extend downwardly beneath an idler roll 60 mounted at opposed ends thereof in suitable bearing blocks 61, only one of which is shown in Figure 3, suitably secured, as by screws 62a, to the proximate surfaces of the loom frame extensions 56 and 57.

The terry loop warp yarns W-1 partially encircle the idler roll 60 and then pass upwardly over a terry or loop warp feed control roll 62 which is shown in Figures 3 and 8 as being of tubular construction and being closed at opposed ends thereof. This roll 62 is fixed on a shaft 63 which extends longitudinally thereof and one end of which is rotatably mounted in a bearing block 64 suitably secured to the inner face of the loom side frame extension 57.

The other end of the shaft 63, that is, the end of the shaft 63 adjacent the right-hand loom side frame member 13, is rotatably mounted in a bearing block 66 (Figures 1, 2, 3 and 8) suitably secured, as by screws 67, to the extension 56 of the loom side frame member 13. The rolls 60 and 62 are parts of the present invention and the roll 62 has friction and clutch means associated therewith, the structure and purpose of which is to be later described.

The sheet of warp W-1 surmounts the roll 62 and then extends downwardly and rearwardly at an angle and passes partially around a special whip roll 70 which is rotatably mounted at opposed ends thereof in special whip roll arms 71 which extend downwardly and forwardly and are suitably secured to a special whip roll shaft 72. This special whip roll shaft is oscillatably mounted in whip roll shaft brackets 73, there being one of these brackets 73 suitably secured to each loom side frame member 13 and 13a.

These brackets 73 also support a conventional whip roll shaft 75 which is oscillated by conventional means including a whip roll actuating arm 76 secured to one end of the shaft 75.

This whip roll shaft 75 has conventional whip roll brackets 77 suitably secured thereto which extend rearwardly and in which opposed ends of the conventional whip roll 35 are rotatably mounted. The whip roll shaft 72 has the rear end of a special whip roll actuating arm 80 suitably secured thereto (Figure 1) which extends forwardly and has a follower wheel 81 rotatably mounted therein which is adapted to engage a cam wheel 82 fixed on a conventional crank shaft 83 of the loom. This crank shaft 83 is driven in a conventional manner and is mounted for rotation at opposed ends thereof in bearing blocks 84 suitably secured to the upper surface of the loom side frame members 13 and 13a. In Figure 1, it will be observed that the crank shaft 83 has a conventional hand wheel 85 thereon for manually imparting rotation to the crank shaft 83 when desired.

The terry loop warp yarns W-1 extend forwardly from beneath the special whip roll 70 from whence they extend past the harnesses 37 and 38 and through a plurality of vertically movable jacquard heddles 87, to the upper end of each of which a cord 90 is connected and to the lower end of each of which a weight or lingo 91 is attached for drawing the respective heddle 87 downwardly. These cords 90 extend upwardly through the usual comber board 92 which is suitably secured, as by bolts 93, to an angle bar 94 which extends in parallel spaced relation to the horizontal portion of the arch 42 and is connected thereto by suitable substantially L-shaped brackets 95, these brackets 95 being suitably secured at their front ends to the opposed ends of the angle bar 94 and at their rear ends to the arch 42 of the loom.

The cords 90 extend upwardly and each is connected in a conventional manner to a pair of hooks of a jacquard pattern mechanism broadly designated at 100 (Figure 16). This jacquard mechanism 100 is driven by the loom in a usual manner, there being shown connecting rods 100a, 100b in Figure 1 which are instrumental in driving the jacquard mechanism and which are pivotally connected at their lower ends to opposed ends of a crank 100c fixed on one end of a conventional cam shaft of the loom to be later described. In the particular type of jacquard mechanism shown in Figure 16, there are provided two series of vertically disposed hooks 101 and 102 and the upper end of each of the cords 90 is connected to the lower end of one of the hooks in each of the series 101 and 102. The vertically disposed hooks 101 and 102 are controlled by respective banks of horizontally extending needles 103 and 104 and conventional spring means, associated with each of the banks of needles 103 and 104, urge the banks of needles 103 and 104 towards conventional respective odd and even cylinders 105 and 106 which are alternately rotated in a step-by-step manner through conventional means not shown. The cylinders 105 and 106 carry respective series of odd and even pattern cards broadly designated at 107 and 108 which are variously perforated according to the desired pattern so that when the cards 107 and 108 are positioned for engaging the needles, the needles merely pass through various perforations alined therewith and leave the corresponding hooks 101 and 102 in position to be raised by corresponding griff bars, there being two groups of these griff bars indicated at 111 and 112 which correspond to the respective hooks 101 and 102.

These griff bars 111 and 112 are alternately raised by conventional means, not shown, so as to raise any hooks which happen to be in their path. On the other hand, the imperforate areas in the pattern cards engage the needles alined therewith, thrusting these needles longitudinally, and thereby flexing the corresponding hooks laterally to clear the corresponding griff bars. Since the particular type of jacquard mechanism 100 shown in Figure 16 is the well known double cylinder, double lift, jacquard, a further description and illustration thereof is deemed unnecessary. Most of the parts of the loom heretofore described are conventional, except as noted, and with which a jacquard mechanism is adapted to be associated, and it is with these parts that the present invention is adapted to be associated.

In order that a clear understanding may be had of the function of the various parts of the present invention as they are described, a description of the fabric produced with this apparatus will first be given. Referring to Figures 17 and 18 the fabric is shown in detail, the various warp yarns and pick yarns being greatly enlarged and partially exploded with respect to each other for purposes of clarity. In order to produce a relatively large fluffy loop of the fabric F, the loop warp yarns W-1 are of substantially greater diameter than that of the basic warp yarn W-2 and are of relatively loose twist. In Figure 17, there are shown 12 basic warp yarns W-2 disposed between each of the loop warp yarns W-1. However, it is to be understood that any desired number of basic warp yarns W-2 may be disposed between the loop warp yarns W-1 according to a desired pattern and, also, there may be more than one loop warp yarn W-1 between adjacent basic warp yarns.

The particular fabric shown in Figures 17 and 18 is made in repeats of 12 picks or weft yarns resulting in loops L being formed in the fabric every 12 picks. For purposes of description, each of the groups or repeats of 12 picks shall be designated separately and the groups of repeats shown in Figure 18 include repeats A, B, C, and D all of which are substantially the same with the exception that the loop L in group D extends from the bottom of the fabric F instead of from the top thereof as the loops L are shown in the repeats B and C. The 12 picks or weft yarns of the groups or repeats A, B, C and D are indicated respectively at 1 to 12 and as each succeeding repeat is woven, the two weft yarns 12 and 1 at the juncture of adjacent repeats such as the repeats A, B are thrown across the lay, the weft yarn 12 being thrown across the lay with the normal beat-up stroke of the lay and the weft yarn 1 being thrown across the lay upon a shorter than normal stroke of the lay, with the result that the weft yarn 1 will be spaced a certain distance from the weft yarn 12.

This will result in a greater than normal length of the loop warp yarn W-1 being disposed between the weft yarn 12 and the succeeding weft yarn 1 and as the lay moves away from the beat-up point, the tension in the loop warp yarns W-1 is relaxed a predetermined amount so that upon the weft thread 2 being thrown across the lay, upon a succeeding normal beat-up stroke of the lay, the weft yarn 2 will be beaten up against the fabric already made at the same time as the weft yarn 1 is beat-up against the weft yarn 12. This will slide a part of the slackened loop warp yarns W-1 toward the beat-up point and upon the weft yarn 3 being thrown across the lay in a subsequent beat-up stroke of the lay, this weft yarn 3 will cause the loop warp yarns W-1 to slide on the basic warp yarns W-2 and on the upper surfaces of the two picks 1 and 2, which are kept tight, carrying with them the less tensioned loop warp yarns W-1 which will form, according with their interlacing, loops at the top or at the bottom of the fabric being woven. It is evident that the picks 1 and 2 of repeats B and C are disposed beneath the loop warp yarns W-1 thus causing the loop L to be formed extending upwardly or in the opposite direction from the weft yarns 2 and the weft yarns 1 and 2 in group D being disposed above the loop warp yarns W-1 will cause a loop L to be formed facing downwardly or in the opposite direction from the loops L in the repeats B and C.

It is thus seen that, in order to produce a fabric of the type shown in Figures 17 and 18, it is necessary to provide pattern controlled means for varying the beat-up stroke of the lay at predetermined intervals and to provide pattern controlled means coacting with the means controlling the variable beat-up stroke of the lay for increasing the supply of loop warp yarns W-1 to the reed or lay or, in other words, slackening the amount of tension in the warp yarns W-1 momentarily while retaining a constant normal tension in the base warp yarns W-2.

Since, in the present instance, the shortened stroke of the lay 20 occurs upon the beat-up of a weft yarn preceding the beat-up of the weft yarn in which the loop warp yarn W-1 is slackened or fed at a faster than normal rate relative to the base warp yarns W-2, a description of the manner of varying the beat-up stroke of the lay will first be given.

Now, referring to Figure 16, it will be observed that there is provided two cords 90a and 90b in addition to the conventional cords 90 and each of which is also connected to one of the hooks from each of the groups 101 and 102. The cord 90a is instrumental in effecting a shortened stroke of the lay 20, in a manner to be presently described, and the cord 90b is instrumental in effecting operation of the loop warp feed control roll 62 in a manner to be later described. The cords 90a and 90b extend downwardly from the jacquard mechanism 100 and are pivotally connected at their lower ends to respective bell cranks 111a and 112a which are oscillatably mounted intermediate their ends on a stud or stub shaft 113 (Figures 12 and 13) which is suitably secured at one end thereof in a bracket 114. The bracket 114 is suitably secured, as by screws 115, to the horizontal portion of the girt 42. The end of the bell crank 111a remote from the end to which the cord 90a is connected has a generally horizontally disposed connecting rod 120 pivotally connected thereto (Figure 12) which is connected to one end of a flexible belt 121 which passes over a grooved pulley 123. The pulley 123 is rotatably mounted on one end of a stub shaft 124 (Figure 14) which extends rearwardly and is fixedly mounted in a block 125 suitably secured to the upper surface of the horizontal portion of the arch 42.

The belt or rope 121 then extends downwardly and adjacent the inner face of the loom side frame member 13 and passes beneath a grooved substantially semi-circular pulley 127 (Figures 3, 5 and 15) one face of which is cut away and flattened, as at 130, for purposes to be later described. The substantially semi-circular pulley 127 is rotatably mounted on a horizontally disposed stub shaft 128 projecting from a bracket 129 which is adjustably secured, as by a screw 131, to the inner surface of the loom side frame member 13, the bracket 129 being provided with a vertically extending slot 129a which is penetrated by the screw 131.

It will be observed in Figure 5 that this belt or rope 121 is suitably secured, as by a screw 125a, to the substantially semi-circular pulley 127 and is resiliently connected, as by a tension spring 132, to a pitman latch actuating arm 133 which extends upwardly and is fixedly mounted adjacent one end of a transversely extending pivot shaft 134 oscillatably mounted in suitable bearing 135 and 136 suitably secured to the proximate faces of the loom side frame members 13 and 13a respectively. Since the parts of the present invention at the left-hand side of the loom in Figure 2 are identical to the parts at the right-hand side of the loom, except being opposite hand and except as will be later described, only the parts at the right-hand side of the loom will be described and like parts at the left-hand side of the loom will bear the prime notation.

The rear ends of pitman pawls or latches 140 and 140' are fixed on the shaft 134 adjacent opposed ends thereof, both of these pawls 140 and 140' being identical except being opposite hand. The pawl 140 extends forwardly and is provided with a hook portion 141 and a curved cam surface 142 which are adapted to be engaged by a pitman breaking pin 143. This pin 143 may be fixedly secured to one side of a pitman breaking arm or link 145 if so desired and it is shown in Figure 5 as projecting from an adjustment plate 146 having adjustment slots 147 therein which are slidably penetrated by screws 148 for securing the plate 146 to the pitman breaking link 145.

Since the breaking link 145 must move to and fro with the corresponding sword 17, the rear end thereof must have freedom of movement but must move in substantially the same horizontal plane throughout its to and fro movement. Therefore, the rear portion of this pitman breaking arm 145 rests in a suitably grooved roller 152 which is rotatably mounted on the shaft 134 to permit freedom of movement of the pitman breaking arm 145. The front end of the pitman breaking arm 145 curves upwardly and is pivotally connected, as at 153, to an arm 154 of a bell crank broadly designated at 155. This bell crank 155 is oscillatably mounted intermediate its ends on a link pivot pin 156 which slidably penetrates the corresponding sword 17 rearwardly of the lay 20, this sword being substantially U-shaped in cross-section and also having the front end of a hinge link 157 pivotally mounted thereon.

The link 157 extends rearwardly and the reduced rear end thereof is pivotally mounted on a hinge pin 160. The bell crank 155 has an arm 161 integral therewith which extends at substantially right angles to the arm 154 and which is provided with an elongated opening or slot 162 for slidable reception of the hinge pin 160. The rear end of the link 157 is penetrated by the hinge pin 160 and extends between spaced ears 163 of a front pitman rod block 164, these ears 163 also being pivotally mounted on the pin 160 so the front pitman rod block 164 and the link 157 may be swung about the hinge pin 160 relative to each other.

The front pitman rod block 164 is a part of a pitman rod or pitman arm broadly designated at 165, the remaining parts of which will be presently described. The link 157 has a pair of oppositely directed projections 166 and 167 integral therewith and adjacent the rear end thereof, the projection 166 being threadably penetrated by an adjustment screw 170 which is held in adjusted position by lock nut 171 and which is adapted to bear against the front pitman rod block 164 when the pitman rod 165 and the link 157 are pivoted relative to each other from substantially the position shown in Figure 3 to the position shown in Figures 4 and 5.

The pitman rod 165 includes a pair of spaced parallel guide rods 175 and 176 (Figures 4 and 5), the right-hand ends in Figure 5 being threadably embedded in the front pitman rod block 164 and being locked therein by suitable lock nuts 177 threadably mounted thereon. The left-hand ends of the guide rods 175 and 176 slidably penetrate mating bearing block members 180 and 181 which comprise a split bearing which is rotatably mounted on a crank throw 182 of the crank shaft 83 heretofore described. These bearing block members 180 and 181 are suitably secured to each other by suitable screws 184. The left-hand ends of the guide rod 175 and 176 each have a nut 185 threadably mounted thereon against which the bearing member 181 is urged by compression springs 186 and 187 which surround the corresponding guide rods 175 and 176. The front ends of the compression springs 186 and 187 bear against a common plate 190 which is slidably penetrated by the guide rods 175 and 176.

The pressure exerted by the compression springs 186 and 187, against the bearing member 180 and thus to the bearing member 181, is adjusted by means of suitable nuts 191 on the guide rods 175 and 176, against which the plate 190 is urged by the compression springs 186 and 187. A suitable spring anchor, in the form of a plate 192, is suitably secured to the bearing member 181, as by one of the screws 184 which secure the bearing members 180 and 181 together, and this spring anchor has the rear end of a tension spring 194 suitably connected thereto. The tension spring 194 extends forwardly and its front end is suitably connected to a suitable spring anchor, in the form of a plate 195, which is suitably secured, as by a screw 196, to the projection 167 on the link 157.

The spring 194 normally urges the hinge pin into substantial alinement with the axes of the crank shaft 83 and the pin 156 and the projection 167 then bears against the block 164 and causes the pin 160 to assume a position slightly below dead center.

In operation, upon either of the hooks 101 and 102, to which the cord 90a is connected, being elevated by the corresponding griff bars 111 and 112, the wheel 127 will rotate substantially a quarter revolution in a counter-clockwise direction in Figure 5 and the horizontal portion of the belt 121 will move from left to right in Figure 5 and will resiliently move the arm 133, shaft 134 and the latch 140 in a counter-clockwise direction in Figure 5. The wheel 127 is flattened to prevent excessive movement of the lower horizontal portion of the belt 121, since the lift of the jacquard hooks is such as to move the wheel 127 about a quarter revolution, this will move the flattened surface 130 from a vertical to a horizontal position substantially parallel with the lower portion of the belt 121 to cause less horizontal movement thereof than to the vertical portion thereof and to thus prevent undue strain on the spring 132.

Now, in the event of the pitman breaking arm 145 being in a course of movement from right to left in Figure 5, which occurs during a backward stroke of the lay 20, the pin 143 will normally override, with suitable clearance, the latch 140 and, upon a subsequent beat-up stroke of the lay 20, and the corresponding swords 17 and 17a, the pitman breaking arm 145 will move forwardly or from left to right in Figure 5 until the pin 143 engages the notch defined by the projection 141 on the pitman latch 140. The lay 20 will then stop its forward movement and the crank throw 182 will overcome the tension in the spring 194 sufficiently to "break" the pitman rod 165, that is, to cause the link 157 and the pitman rod 165 to swing upwardly at their proximate ends from substantially the position shown in Figures 1 and 3 to substantially the position shown in Figures 4 and 5. The cam surface 142 on latch 140 serves to engage and elevate pin 143 thereover if the latch 140 becomes stuck in the path of pin 143 upon a return stroke thereof through malfunction of associated parts. The pin 143 engages the latch 140 after the shuttle has been thrown into the corresponding shuttle box so the following "break" of the pitman rods will not interrupt the normal flight of the shuttle across the lay. It might be stated that, in order that the normal flight of the shuttle is not interrupted, it is necessary that the "breaking" of the pitmans and their return to normal position must take place after the shuttle has fully entered the corresponding shuttle box and as it reposes therein and before the shuttle is again discharged from the shuttle box.

It is thus seen that the pitman rod 165 and the corresponding throw 182 of the crank shaft 83 may complete a normal forward stroke although the lay 20 is prevented from moving forwardly beyond a predetermined point. This will result in a weft yarn being thrown across the lay substantially short of the previously cast weft yarn and providing an opening therebetween through which the loop L (Figure 18) may project upon a subsequent beat-up stroke of the lay 20 which is of normal length, that is, upon the beat-up of the lay to a normal beat-up position.

It is evident that, upon a backward stroke of the lay following the short beat-up stroke thereof which has been previously described, the tension spring 194 will cause the link 157 and the pitman rod 165 to again move downwardly at their proximate ends and the projection 167 on the link 157 will engage the proximate face of the block 164. This will insure that the hinge pin 160 will not move upwardly inadvertently during normal beat-up strokes of the lay 20.

The pin 143 is adjustably relative to the arm 145 (Figure 5) so that the time at which the pin 143 engages the notch defined by the projection 141 on the pitman latch 140 during a beat-up stroke of the lay 20 may be adjusted so as to provide an "opening" of predetermined displacement between a normally beat-up weft yarn and a subsequently beat-up weft yarn during a short beat-up stroke of the lay 20. This will, in conjunction with the feed of the pile warp, determine the length of the loop L formed upon subsequent beat-up strokes of the lay 20. In describing the operation of the means for varying the stroke of the lay 20, although reference had been made to only the pitman rod 165, the link 157 and associated parts, it is evident that the pitman rod 165 and corresponding associated parts are operated in an identical manner relative to the sword 17a.

In order to insure that the latch 140 will return to inoperative position following a relatively short beat-up stroke of the lay, that is, following its return from the position shown in Figure 5 to the position shown in Figures 3 and 15, the latch actuating arm 133 extends downwardly substantially beyond the point at which the tension spring 132 is connected and has a shouldered pin 133a fixed thereon. A link 183 has a slot 183a therein which is mounted for longitudinal sliding movement on the pin 133a. The link 183 is adjustably secured in a clevis 183b which is, in turn, pivotally mounted adjacent the upper end of a cam follower arm 188. This arm 188 extends downwardly and is pivotally mounted, as at 188a on the loom side frame member 13 (Figure 15). The cam shaft 53 has a cam 189 fixed thereon and since the cam shaft 53 usually rotates at one-half of the speed of the crank shaft 183, the cam 189 is so positioned as to engage the arm 188 to move the same in a counter-clockwise direction in Figure 15 upon a backward stroke of the lay 20 following a relatively short beat-up stroke thereof. The follower arm 188 is urged against cam 189 by a tension spring 188b (Figures 3 and 15).

As the cam 189 engages the cam follower arm 188, the right-hand wall of the slot 183a in the link 183 engages the pin 133a causing the shaft 134 and the corresponding pitman latches 140 and 140' to move in a clockwise direction, in Figure 15, to where the projection 141 on the latch 140 will be disposed out of the path of travel of the pin 143 on the pitman breaking arm 145 upon the succeeding beat-up stroke of the lay 20.

When the latch 140 is raised for engagement with pin 143 it is essential that the raising of the latch takes place at the earliest possible time so that it will be fully raised when engaged by the forward moving pin 143. Hence, it is necessary to complete the raising of the latch 140 during the first fractional portion of the lift of the jacquard hooks 101 and 102. The wheel 127 by its flattened surface would take up most of the lift after the latch is fully raised. However, when a mechanical movement takes place between two extreme positions of a reciprocating motion, there are two points of action, one at a given point in one direction and another at the same point going in opposite direction. Therefore, if the raising of the latch 140 has been completed in the first quarter of the lift, it is obvious that one pick later the latch will still be raised by the last quarter of the lift of the jacquard hooks 101 and 102. The latch would, therefore, engage the pin 143 twice in succession, resulting in two successive short strokes of the lay. To prevent the second engagement, the cam 189 through its connection with arm 133 will depress the latch against the resistance of spring 132 until the hooks 101 and 102 have fully returned to their lowest position.

It will be observed, in Figure 15, that the front and rear surfaces of the arm 133 are adapted to alternately engage respective pins 193 and 193a which project towards the observer in Figure 15 from the horizontal leg of a substantially L-shaped bracket 196 suitably secured, as by screws 196a, to the inner face of the side frame member 13. The front pin 193a is provided to insure that the tension spring 132 extending from the belt 121 may urge the notch defined by the projection 141 on the arm 140 into accurate alinement with the pin 143 upon a forward stroke of the arm 145 and during which the lay 20 and the reed 22 are stopped in advance of the normal beat-up point in the manner heretofore described.

Since the tension in the tension spring 132 will be relaxed at times during normal beat-up operations of the lay 20, and also in view of the fact that the cam follower arm 188 will not be engaged by the lobe of the cam 189 except at predetermined intervals, after the arm 133 has been swung to the position shown in Figure 15, through engagement of the pin 133a with the right-hand wall of the slot 183a in the link 183, a tension spring 132a of less strength than spring 132 will urge the arm 133 to remain in engagement with the pin 193, the pin 193 serving to limit downward movement of the latch 140 when the tension in the spring 132 is relaxed.

Inasmuch as the relatively short beat-up stroke of the lay 20 may be as much as, and possibly greater than, an inch less than the normal beat-up stroke of the lay and which is substantially less than the short beat-up stroke of lays heretofore associated with terry looms, it has been found necessary to provide means for insuring that the weft yarn will be cast across the lay 20 in parallel relation to the reed throughout its length and also in spaced parallel relation to the previously beat-up weft yarn. It has also been found necessary to provide means for effecting normal operation of the conventional filling fork when the weft yarn is cast across the lay during a relatively short beat-up stroke of the lay.

The loom is provided with the usual type of temples 200 and 201 suitably secured at their front ends to the breast beam 14 (Figures 2 and 3) and which are provided for the well known purpose of stretching the woven fabric transversely adjacent the beat-up point and for guiding the fabric to the conventional take-up mechanism. The weft yarn parallelizing or guiding mechanism is broadly designated at 202 (Figure 11) and includes a plate 203 which is secured to the outer surface of the right-hand temple 200 adjacent the end thereof nearest the lay 20 by any suitable means such as shoulder screws 204 and 205. These screws 204 and 205 have respective gear segments or quadrants 206 and 207 oscillatably mounted thereon which are in engagement with each other and the segment or quadrant 207 being of substantially greater pitch diameter than that of the quadrant 206. The quadrant 206 has a rearwardly extending arm 210 integral therewith in the free end of which the horizontal leg 213 of a substantially L-shaped pin 212 is adjustably secured, as by a set screw 214. The lower end of the pin 212 is pointed so it may be guided between the adjacent selvage warp yarns upon each beat-up stroke of the lay by means to be presently described, so that as the shuttle, not shown, is thrown across the lay from right to left in Figure 2, the weft yarn payed out thereby will engage the pin 212. As the lay 20 approaches the end of its forward stroke, the pin 212 is raised out of engagement with the warp yarns so a normal beat-up takes place without interference from the pin 212. Although the pin 212 is withdrawn from engagement with the weft yarn as the lay 20 moves in a forward stroke, the immediate weft yarn will have been guided into the shed formed by the warp yarns at a point spaced substantially from the previously beat-up weft yarns and, consequently, will remain substantially parallel to the previously beat-up weft yarn and the reed 22 so as to be moved toward but not into engagement with the previously beat-up weft yarn upon the subsequent beat-up stroke of the lay 20. In other words, the pin 212 is preferably disposed a greater distance from the previously beat-up weft yarn than the succeeding weft yarn will be disposed upon a relatively short beat-up stroke of the lay 20.

Now, in order to move the pin 212 upwardly to inoperative position upon each beat-up stroke of the lay 20, the quadrant 207 is provided with an extension 215, which extends downwardly in the horizontal plane of the lay 20, and the lay has a suitable bunter 216 thereon which engages the extension 215 of the quadrant 207 to impart a partial revolution to the quadrant 207 in a clockwise direction in Figure 11 upon a beat-up stroke of the lay 20.

In order to return the pin 212 to operative position upon a backward stroke of the lay 20, the quadrant 207 has a tension spring 217 connected thereto at the opposite side thereof from the extension 213 and this tension spring 217 extends forwardly and downwardly in Figure 11 and is connected at its other end to a forwardly extending portion 220 integral with the plate 203 on which the mechanism 202 is mounted. Thus, the tension spring 217 will transmit a partial revolution to the quadrant 207 in a counter-clockwise direction in Figure 11 upon a backward stroke of the lay 20 resulting in a partial revolution being imparted to the arm 210 on the quadrant 206 in a clockwise direction so as to assume an operative position as shown in Figure 11 simultaneously with the shuttle, not shown, being thrown across the lay 20 from right to left in Figure 2 and immediately preceding each beat-up stroke of the lay 20.

*Filling fork actuating means*

As previously stated, the relatively short beat-up stroke of the lay 20 is such as that the weft yarn thrown across the lay immediately preceding a relatively short beat-up stroke of the lay will be spaced such a distance from the previously beat-up weft yarns that it will fail to engage the conventional filling fork to move the same to inoperative position with the result that, ordinarily, the loom will stop upon each relatively short beat-up stroke of the lay 20. The structure and function of the usual type of weft detecting filling fork mechanism for stopping a loom in the event of failure of a filling thread being thrown across the lay are well known to those familiar with the art and, therefore, no attempt will be made in this specification to completely disclose the structure and operation of the conventional type of filling fork.

The particular filling fork shown in Figure 4 may be of a type substantially as shown in United States Patent No. 749,364 of January 12, 1904.

It is to be understood, however, that the filling fork mechanism need not be limited to the particular type shown in said patent. In Figure 2, there is shown a right-hand weft detecting fork filling motion 225 which has been omitted from Figure 3 for purposes of clarity and there is also shown a left-hand weft detecting fork filling motion broadly designated at 226, these fork filling motions 225 and 226 being spaced inwardly from opposed ends of the breast beam 14.

Since the shuttle, not shown, moves from right to left in Figure 2 along the lay 20 only upon each relatively short beat-up stroke of the lay 20 and, in this particular instance, does not, at any time, move from left to right during a relatively short beat-up stroke of the lay 20, the right-hand weft detecting fork filling motion 225 is not pertinent to the present invention and only the left-hand weft detecting fork filling motion 226 will be described in detail when the description will then be given of the improved means for swinging the filling fork to inoperative position upon a weft yarn being thrown across the lay during a relatively short beat-up stroke of the lay 20. It is evident that a similar actuating means for the right-hand weft detecting fork filling motion 225 may be provided in the event of an odd number of picks being cast with each repeat of the weave and, in which event, the short beat-up will occur with the shuttle alternatively at opposed ends of the lay 20.

The structure of the weft detecting fork filling motion 226, which is pertinent to the present invention, is shown at an enlarged scale in Figure 4. The left-hand fork filling motion 226 includes a filling motion stand 227 suitably secured, in a conventional manner to the upper surface of the left-hand portion of the breast beam 14 and in which a conventional filling fork slide 230 is mounted for horizontal sliding movement. The right-hand end of the filling fork slide 230 straddles a conventional fork holder 231 which is oscillatably mounted in the filling fork slide 230 and which has a filling fork 232 projecting downwardly therefrom and a latch portion 233 projecting forwardly therefrom which, upon failure of the fork 232 to be engaged by a weft yarn, or by the improved mechanism to be presently described, will engage conventional means, not shown, which will, in turn, cause the filling fork slide to move from right to left for actuating conventional means, not shown, for stopping the loom in a manner well known to those familiar with the art.

The lay 20 is provided with conventional filling grates 234 and 234a which are disposed adjacent opposed ends of the reed 22 and the reed cap 21 in alinement with the respective fork filling motions 226 and 225. During normal operation of the loom and upon normal length beat-up strokes of the lay 20, the filling fork 232 engages the front surface of the weft yarn and is caused to swing in a clockwise direction so as to assume substantially the position shown in Figure 4 due to the rear surface of the weft yarn bearing against the front surface of the corresponding fork grate 234. In the absence of the filling yarn being disposed across the grate 234 the filling fork 232 will project through the usual openings in the grate 234 and, thus, will not be swung to occupy the position shown in Figure 4 and, therefore, will cause the conventional means, not shown, to move the filling fork slide 230 from right to left in Figure 4 to stop the loom.

Now, due to the relatively short stroke of the lay 20 upon the latches 140 and 140' being elevated to the position that the latch 140 occupies in Figure 5, for "breaking" the pitman rod 165, and as it is also shown in Figure 4, the weft yarn and the grate 234 will stop short of the previously beat-up weft yarn with the result that the weft yarn and the grate 234 will fail to engage the filling fork 232. Therefore, there is provided a substantially L-shaped filling fork actuator 240 which is suitably secured, as by screws 241, to the arm 161' of the bell crank 155' and this filling fork actuator 240 has a forwardly extending arm 242 integral therewith, on the free end of which a suitable bunter 243 of resilient material, such as leather or the like, is adhesively secured.

This filling fork actuator 240 is preferably made of a thin material, such as sheet metal, so the arm 242 thereof may project through the corresponding opening in the conventional fork grate 234 upon the proximate ends of the pitman arm 165' and the link 157' being pivoted upwardly as shown in Figure 4 in the manner heretofore described. Since the proximate ends of the pitman arm 165' and the link 157' are pivoted upwardly relative to their remote ends simultaneously with the beat-up stroke of the lay 20, the arm 242 of the filling fork actuator 240 will simultaneously project through the fork grate 234 and the bunter 243 on the free end of the arm 242 will engage at least one of the tines of the filling fork 232, causing the same to swing in a clockwise direction to assume substantially the position shown in Figure 4 to thus permit the loom to continue its operation.

It is evident that, upon a succeeding backward stroke of the lay 20, the corresponding tension spring 194' will cause the proximate ends of the link 157' and the pitman arm 165' to assume a position in substantial alinement with each other and will withdraw the forwardly extending arm 242 of the filling fork actuator 240 from the grate 234 and in which position the filling fork actuator 240 will remain during all normal length strokes of the lay 20. This will permit the filling fork 232 to operate in a conventional manner during normal beat-up strokes of the lay 20.

This completes the description and manner of operation of the improved pattern controlled means for varying the length of the beat-up stroke of the lay 20 and the associated means for insuring that the weft yarn will be disposed in parallel relation to the previously beat-up weft yarn upon a relatively short stroke of the lay and also the associated means for actuating the conventional filling fork 232 to prevent the loom from stopping upon a relatively short beat-up stroke of the lay 20.

*Pattern controlled variable let-off mechanism for loop warp*

It has already been described that in order to produce the loops L on the fabric shown in Figures 17 and 18, immediately following a relatively short beat-up stroke of the lay 20, in which the weft yarn 1 is thrown across the lay, the tension in the loop warp yarns W-1 is relaxed a predetermined amount, according to the desired length of the loop L to be formed upon the subsequent picks or weft yarns 2 and 3 being woven.

Now, referring to Figure 19, there is shown a plurality of the odd and even pattern cards 107 and 108 there being only enough of the cards in Figure 19 to include a cycle in the operation of the variable beat-up mechanism. It will be noted that every sixth card, designated at 108a in the 108 series of pattern cards is provided with a pair of closely spaced perforations 108b and, since the cards 107 and 108 alternate in operating upon the banks of needles 103 and 104, it is evident that the needles in the bank of needles 104 which coincide with the perforations 108b in the series of cards 108 will fail to flex the corresponding hooks 102 to which the cords 90a and 90b are connected upon every twelfth beat-up stroke of the lay 20. As is well known to those familiar with the art, upon failure of any hooks in either of the groups 101 and 102 being flexed so the upper ends thereof will be disposed out of alinement with the corresponding griff bars 111 and 112, the corresponding griff bars 111 and 112 will cause the hooks 101 and 102 to move upwardly and thus, the cords 90a and 90b will be moved upwardly simultaneously upon every twelfth pick of the loom.

One end of a connecting rod 250 (Figure 12) is pivotally connected to the end of the bell crank 112a remote from the end to which the lower end of the cord 90b is connected and the other end of the connecting rod 250 is pivotally connected to one of the arms of a bell crank 251. The bell crank 251 is oscillatably mounted, as at 252 (Figure 14) on a substantially Z-shaped bracket 253 which extends forwardly and is then bent downwardly and is suitably secured, as by a bolt 254, on the horizontal portion of the arch 42.

The end of the bell crank 251 remote from the end to which the connecting rod 250 is pivotally connected has the upper end of a connecting rod or link 260 pivotally connected thereto. This connecting link 260 extends downwardly, in Figures 6, 7, 12 and 14, and is pivotally connected to the free end of an extension 261a of a locking latch bar 261 which extends rearwardly and is pivotally mounted, as at 262, on the inner face of the upstanding portion 56 of the side frame member 13 of the loom.

During normal operation of the loom, that is, during normal beat-up strokes of the lay 20 and during normal tension of the loop warp yarns W-1 (Figure 3), the locking latch member 261 engages a reduced portion 264 of a stub shaft 265 slidably mounted in the upper ends of laterally spaced portions 266a and 266b of a let-off cam follower arm broadly designated at 266. The lower portion of the extension 261a is cut away to form a shoulder and the lower surface of extension 261a is adapted to rest on the pin 264 when the reduced portion 264 of the pin 265 is engaged by the locking latch bar 261 and when the corresponding hook 102 of the jacquard mechanism 100 (Figure 16) is not raised by the corresponding griff bar 112.

A cam follower 272 is rotatably mounted, as at 273 (Figure 7), between and intermediate the ends of the portions 266a and 266b of the cam follower arm 266 and is normally urged into engagement with a cam wheel 274, fixed on the crank shaft 83, by a tension spring 275, one end of which is connected intermediate the ends of the portion 266b of the arm 266 and the other end of which is suitably connected to the loom side frame member 13. The lower end of the arm 266 is pivotally mounted on the conventional cam shaft 53.

The upper ends of the portions 266a and 266b of the cam follower arm 266 straddle the front end of a front link section 277 which is pivotally mounted on the stub shaft 265 heretofore described. This front link section 277 extends rearwardly and has a pair of spaced adjustment slots 280 therein which are penetrated by screws 281 for adjustably securing the front link section 277 to a rear link section 282.

The rear end of the rear link section 282 is pivotally connected, as at 283, to the lower end of a rocking overriding clutch extension arm 284. The overriding clutch extension arm 284 extends upwardly and is suitably secured, as by bolts 285 (Figures 8 and 9), to a projection 286 on a substantially annular rocking overriding clutch housing 287 provided with a substantially centrally disposed bore 290 which slidably encircles an overriding clutch bore or hub 291 which is preferably of greater thickness than that of the housing 287 (Figures 8 and 9). This housing 287 is a part of a first or rocking overriding clutch indicated broadly at 288.

The overriding clutch bore 291 is slidably mounted on a reduced end portion 63a of the let-off roll shaft 63 but is held in fixed relation to the reduced portion 63a of the shaft 63 by means to be presently described. The core has a plurality of circularly spaced notches or slots 292 cut in the periphery thereof, these slots forming a substantially triangular cavity when the core 290 is assembled with the housing 287. The surfaces of the slots 292 disposed nearest the shaft 63a are disposed at an acute angle with respect to lines extending from the center of the hub or core 291 and bisecting each of the slots 292.

Each slot 292 has an adjacent cavity or bore 293 which is adapted to accommodate a compression spring 294. Each of the slots 292 has a suitable roller or ball 295 therein which is urged against the interior surface of the housing 287 and also against the surface adjacent the shaft 63a at the narrow end of the slot 292 by the compression spring 294.

It is thus seen that upon the housing 287 moving in a clockwise direction in Figure 9, rotation in the same direction will be transmitted to the hub 291 by the balls 295 in the slots 292. However, upon movement of the housing 287 in the opposite or counter-clockwise direction in Figure 9, the balls 295 will be urged towards the large ends of the corresponding slots 292 and thus the hub 291 and the corresponding shaft 63 may remain stationary during counter-clockwise movement of the housing 287.

Now, referring to Figure 6, it will be observed that the cam 274, which rotates a revolution upon each beat-up stroke of the lay 20, will engage the cam follower 272 carried by the arm 266 to cause the arm 266 to move in a counterclockwise direction in Figure 6. This will cause the rocking clutch housing 287 to rotate a partial revolution in a clockwise direction, assuming the connecting rod 260 to have elevated the latch bar 261 out of engagement with the reduced portion 264 of the stub shaft 265. This will transmit a partial revolution to the improved loop warp feed control roll 62 which is fixed on the shaft 63 as heretofore described.

It is preferable that the outer surface of the improved let-off roll 62 be roughened so as to provide traction for the warp yarns W-1 passing over the same. In order to insure that the shaft 63 and the roll 62 will not turn backwards, in a clockwise direction in Figure 3, upon the arm 266 being moved in a clockwise direction in Figure 6 by the tension spring 275, a second overriding clutch, broadly designated at 300, which may be termed a shaft locking overriding clutch is provided. This overriding clutch 300 is of substantially the same structure as that of the overriding clutch 288.

Since the second overriding clutch 300 is of identical structure to that of the first overriding clutch 288, a further description of the overriding clutch 300 will be omitted and the same reference characters shall apply to the parts of the overriding clutch 300 which are identical to the parts of the overriding clutch 288 with the prime notation added. By comparing Figures 9 and 10, it will be noted that the narrow ends of the cavities or slots 292 and 292' face in the same direction relative to the reduced portion 63a of the shaft 63. However, the extension 284' of the second overriding clutch 300 extends upwardly rather than downwardly, as does the extension 284 of the overriding clutch 288, and is suitably secured, as by screws 301 to the upstanding portion 56 of the loom side frame member 13. Thus, the housing 287' of the overriding clutch 300 will permit movement of the core or hub 291' in a clockwise direction upon movement being imparted to the reduced portion 63a of the shaft 63 in the manner heretofore described. However, upon movement of the housing 287 of the first overriding clutch 288 in a counter-clockwise direction in Figure 9, the housing 287' of the overriding clutch 300 will remain stationary and thus will prevent the hub, and of course, the shaft 63, from moving in a counterclockwise direction in Figures 9 and 10.

The hubs 291 and 291' of the respective clutches 288 and 300 are slidably penetrated by the reduced portion 63a of the shaft 63 so they may be adjusted about the reduced portion 63a. However, they are held in fixed relation to the reduced portion 63a by means of friction disks 302, 303 and 304 which are spaced apart from each other as shown in Figure 8, the disks 302 and 304 bearing against the remote surfaces of the hubs 291 and 291' and the disk 303 bearing against the proximate surfaces of the hubs 291 and 291'. These disks 302, 303 and 304 are keyed, as at 305, to the reduced portion 63a of the shaft 63 and the disk 304 is also secured on the reduced portion 63a by a set screw 306.

It will be observed, in Figure 8, that the right-hand end of the disk 304 is urged against the shoulder formed by the junction of the reduced portion 63a with the shaft 63 and the elements 302, 291, 303 and 291' are successively urged against the disk 304 by any suitable means, such as a hand wheel 310 threadably mounted on the reduced portion 63a of the shaft 63. A threaded collar 311 is also threadably mounted on the reduced portion 63a (Figure 8) at the same time that the hand wheel 310 is mounted thereon. The hand wheel and the collar 311 are provided with respective stop pins 313 and 314 so that, when the hand wheel 310 has been turned on to the threaded end of the reduced portion 63a sufficiently, the sleeve 311 is then mounted thereon in close relation thereto and the pin 313 on the hand wheel 310 then engages the pin 314 on the collar 311 and like rotation is imparted to the collar 311 as the hand wheel 310 is turned onto the reduced portion 63a for tightening the disk 302 against the hub 291 and the hub 291 against the disk 303 while the disk 303 is also being tightened against the hub 291' and the hub 291' is being tightened against the disk 304 to thus cause the disks 302, 303 and 304 to clampingly engage the adjacent surface of the hubs 291 and 291' thus holding them in fixed relation to the reduced portion 63a of the shaft 63. Suitable means such as a set screw serves to lock the collar 311 on the reduced portion 63a in closely spaced relation to the hand wheel 310 so as to provide means for turning the feed roll 62 in a reverse direction, i. e., clockwise in Figure 3, whenever it may be necessary to do so, such as because of an imperfect weave or in any event where it may be necessary to pick-out some of the woven weft yarns. In order to reverse the feed roll 62, the hand wheel 310 is manually rotated in a counterclockwise direction in Figure 1 until its pin 313 engages the pin 314 on collar 311 and, in so doing, will disengage the overriding clutches 288 and 300. As the pin 313 on hand wheel 310 engages the pin 314 on collar 311 it will impart reverse rotation to the feed roll 62. Of course, upon again turning the hand wheel 310 in a clockwise direction the pin 313 will turn away from pin 314 and the hand wheel will again tighten the clutch cores relative to the reduced portion 63a.

In order to avoid undesirable rotation of the roll 62 beyond the point at which it is rotated by the housing 287 in a clockwise direction in Figure 9, there is provided a suitable friction or brake mechanism including a brake hub 315 which is fixed on the shaft 63, as by set screw 314', and which is peripherally grooved for a suitable friction material 317, such as leather and the like, which may be adhesively or otherwise secured to the periphery of the hub 315. This friction material 317 is engaged by a brake band 320 which partially surrounds the hub 315 and one end of which is secured by one of the screws 67 to the bracket 66. The other end of the brake band 320 is adjustably secured to a stud 321 (Figure 3) projecting from the upwardly extending portion 56 of the side frame member 13.

It is thus seen that there is provided improved means for letting off a desired amount of additional loop warp yarns W-1 immediately following a relatively short beat-up stroke of the lay 20, the cam 274 (Figure 6) being so positioned as to engage the cam follower 272 immediately following a backward stroke of the lay 20 which follows a relatively short beat-up stroke thereof, so as to cause the roll 62 to move a partial revolution in a counterclockwise direction in Figure 3 to feed a predetermined additional length of loop warp yarns W-1 to the reed 22 which will be taken up by the reed 22 upon subsequent beat-up strokes of the lay 20 in the manner heretofore described. It is evident that upon the griff bar being lowered which had elevated the hook to which the cord 90b is connected, subsequent to the cam 274 engaging the cam follower 272 and moving the arm 266 in a counterclockwise direction in Figure 6, the latch bar 261 will engage the reduced portion 264 of the stub shaft 265 to hold the cam follower 272 on the arm 266 out of engagement with the cam 274.

The term "pitman breaking arm" is used to distinguish this arm 145 from others in the specification and claims because the arm 145 causes the hinge pin 160 to move out of alinement with the crank throw 182 and the sword pin 156 to, in effect, "break" the pitman arm 165.

Bobbin transfer revoking apparatus

Each of the repeats of a fabric, such as A, B, C and D in Figure 18, is formed of an even number of picks. In this event each relatively short beat-up stroke of the lay 20 will occur as the shuttle, not shown, is thrown into the shuttle box at the left-hand end of the lay in Figure 2, that is, as the end of the lay remote from the end at which the usual bobbin transfer operation takes place in an automatic loom.

However, in the event of there being an odd number of picks, say 13, in each of the repeats, it is evident that the shuttle would be disposed at the left-hand end of the lay upon alternate relatively short beat-up strokes thereof, and upon the relatively short beat-up strokes of the lay 20 which occur between said alternate short beat-up strokes thereof, the shuttle would be disposed at the right-hand end of the lay and, as is well known to those familiar with the art, in the event of the yarn on the quill in the shuttle having been substantially exhausted upon the immediately preceding normal beat-up stroke of the lay, the conventional transfer mechanism is conditioned so as to cause a transfer operation to take place as the shuttle is thrown into the shuttle box at the right-hand end of the lay.

However, if the lay is in the course of a relatively short beat-up stroke as the shuttle is thrown into the right-hand shuttle box with the transfer mechanism in condition for a transfer operation to take place, the shuttle box, at this point, would not be moved to the usual limit of its forward stroke with the result that it would not be positioned in proper alinement with the filled bobbins and a satisfactory transfer operation could not take place. This would probably result in the shuttle being thrown off of the raceway of the lay upon being thrown out of the right-hand shuttle box or it may cause the filled bobbin which it was to have received to be deposited thereon and to thus engage and sever many, if not all, of the warp yarns which form the upper reach of the shed at the time of the shuttle being thrown across the lay. Therefore, I have provided means for revoking the transfer mechanism although the transfer mechanism may have been conditioned for a transfer operation to take place upon the shuttle being thrown into the corresponding shuttle box during a relatively short beat-up stroke of the lay.

In addition to the conventional parts of the loom heretofore described, there is shown in Figure 20 other conventional parts of the loom which are instrumental in effecting a bobbin transfer operation. It is well known to those familiar with the art that, upon the filling of a bobbin in a shuttle being substantially exhausted, the bobbin will be engaged by a suitable detector, not shown, which will slip on the bobbin and will cause the conventional mechanism to transfer the lowermost bobbin, in a magazine or battery 330 suitably supported on the loom frame member 13, into the shuttle, not shown, the exhausted bobbin being projected on through the shuttle and through a suitable opening in the shuttle box. This filling detector may be of the type such as is shown in United States Patent Nos. 1,313,350; 650,684; 1,496,640 and 1,392,805. This filling detector will cause partial clockwise movement of a conventional starting rod 331 which is oscillatably mounted in suitable bearing blocks 332, only one of which is shown in Figure 20, and which is suitably secured to the front vertical surface of the breast beam 14.

A conventional feeler finger 333 is fixed at one end thereof on the starting rod 331 and extends through a suitable opening in the breast beam 14 and has a conventional starting rod spring hook 335 oscillatably mounted thereon which is normally urged upwardly in Figure 20 against a projection 336 integral with the feeler finger 333 by means of a conventional starting rod spring 337. The free end of the starting rod spring hook 335 has a longitudinally extending slot 340 therein in which a shuttle feeler pin 341 has longitudinal sliding movement.

The pin 341 projects inwardly from a shuttle feeler link 342, the left-hand end thereof in Figure 20 being pivotally connected to a conventional shuttle feeler bracket 344. The shuttle feeler bracket 344 is suitably secured to the loom side frame member 13. The shuttle feeler link 342 has a shuttle feeler 345 integral therewith to which is secured a conventional shuttle feeler tip 346. The shuttle feeler link 342 has suitable means, not shown, connected thereto for effecting a transfer operation upon the shuttle feeler tip 346 being moved towards the lay to occupy a position immediately above the lay 20 upon the lay approaching a beat-up position, the shuttle feeler tip being moved to this position by the shaft 331 and through the intervening connection heretofore described.

It is well known that, upon failure of a shuttle being properly boxed in the shuttle box adjacent the battery 330, the feeler tip 346 will engage the same thus preventing it from moving fully into operative position and thus preventing a transfer operation from taking place.

Now, as heretofore stated, it is necessary that a transfer operation be prevented from taking place in the event of a relatively short beat-up stroke of the lay 20 occurring simultaneously with the shuttle being thrown into the corresponding shuttle box adjacent the magazine 330 and upon the transfer mechanism being conditioned for a transfer operation. Therefore, there is provided a transfer revoking means which is operable only upon a relatively short beat-up stroke of the lay and which comprises an arm 350, one end of which is fixedly mounted on the shaft 134 and which has a plurality of bores or openings 351 therein in any one of which one end of a flexible cord or wire 352 may be suitably connected. This cord extends upwardly and forwardly and over a suitably grooved pulley 353 which is rotatably mounted in a block 354 suitably secured to the comber board 92.

The cord 352 then extends downwardly and forwardly and is attached adjacent the free end of a revoking latch 356 which is pivotally supported, as at 357, on a stand 360 suitably secured to the breast beam 14. During normal operation of the loom, that is, during normal beat-up strokes of the lay 20, the latch 356 is held out of the path of the shuttle feeler tip 346 and will thus permit the usual bobbin transfer operation to take place.

However, upon every relatively short beat-up stroke of the lay 20, the shaft 134 is moved a partial revolution in a counter-clockwise direction, in the manner heretofore described, and this will permit the revoking latch 356 to momentarily fall, by gravity, from a normally elevated position into engagement with the upper surface of the breast beam 14 to be disposed in the normal path of travel of the shuttle feeler tip 346. Thus, in the event of the transfer mechanism being conditioned so as to effect a transfer operation, the latch 356 will engage the shuttle feeler tip 346 at substantially the same point at which it would be engaged by a shuttle in the event of a shuttle not being properly boxed, thus revoking the transfer operation, that is, preventing the transfer operation from taking place. When the shuttle has subsequently entered the right-hand shuttle box, two picks later, the latch 356 will have again been raised to inoperative position, due to the return of the shaft 134, and the usual transfer operation may then be effected.

In the drawings and specification, there has been set forth a preferred embodiment of the invention and although specific terms are employed, they are used in a descriptive and generic sense only, and not for purposes of limitation, the scope of the invention being defined in the claims.

I claim:

1. In a loom having an oscillatable lay and also having means for varying the stroke of the lay and also having an automatic bobbin transfer mechanism and also having means for conditioning the bobbin transfer mechanism for replacing an exhausted bobbin, means automatically operable upon the lay stopping short of the normal beat-up point thereof and upon the bobbin transfer mechanism being conditioned for revoking the conditioning of the bobbin transfer mechanism so as to prevent a bobbin transfer operation from taking place upon a stroke of the lay in which the lay stops short of the normal beat-up point.

2. In a loom for weaving looped fabrics, such as terry fabrics, said loom having an oscillatable lay and also having pattern controlled means for varying the beat-up stroke of the lay and also having a weft detecting fork filling mechanism thereon including a swingable fork adapted to be engaged by the filling upon a normal beat-up stroke of the lay and said lay having a grate thereon registering with the filling fork upon a beat-up stroke of the lay, improved means for swinging the filling fork into inoperative position upon a relatively short beat-up stroke of the lay including a bell crank pivoted rearwardly of the lay and having substantially right-angularly disposed arms thereon, said pattern controlled means being operable for moving the bell crank about its axis in the course of a relatively short beat-up stroke of the lay, a fork actuating arm fixed on one of the arms of said bell crank and being so positioned as to project through the grate on the lay and into the path of the filling fork upon a relatively short beat-up stroke of the lay and upon the bell crank being pivoted on its axis to thus engage and render inoperable the filling fork.

3. In a loom for weaving looped fabrics, such as terry fabric and the like, said loom having an oscillatable lay and also having pattern controlled means for causing a relatively short beat-up stroke of the lay at predetermined intervals and also having means for throwing weft yarns across the lay immediately preceding each beat-up stroke thereof, said loom also having an automatic bobbin transfer mechanism for replacing an exhausted bobbin and said bobbin transfer mechanism including a shuttle feeler which moves towards the lay upon the bobbin transfer mechanism being conditioned for a bobbin transfer operation to take place, means automatically operable upon a relatively short beat-up stroke of the lay occurring simultaneously with the bobbin transfer mechanism being conditioned for a transfer operation to take place for engaging the shuttle feeler to interrupt its movement towards the lay to thus prevent the occurrence of a transfer operation during a relatively short beat-up stroke of the lay.

4. In a loom for weaving looped fabrics and the like, said loom having base warp yarns and also having an oscillatable lay to which the base warp yarns are directed in a weaving operation and also having means for creating normal tension in the base warp yarns and also having a driven crank shaft, said loom also having loop warp yarns and means for directing the loop warp yarns to the lay under normal tension, pattern controlled means for selectively causing a shorter than normal beat-up stroke of the lay, coacting pattern controlled means for momentarily slackening the tension in the loop warp yarns immediately following a relatively short beat-up stroke of the lay comprising a loop warp feed control roll extending transversely of the loom and partially around which the loop warp yarns pass in advance of their passing to the lay, overriding clutch means associated with the loop warp feed control roll and normally permitting rotation of the loop warp feed control roll in the direction of movement of the loop warp yarns thereby as transmitted thereto by the tension in the loop warp yarns moving therewith, a pattern mechanism, mechanical connections between the pattern mechanism and the overriding clutch means for imparting movement to the overriding clutch means which will, in turn, be transmitted to the loop warp feed control roll whereby the loop warp feed control roll will cause the loop warp yarns to be advanced momentarily at a greater than normal rate to relax the tension therein so as to form loops of the slackened looped warp yarns upon the succeeding beat-up strokes of the lay, said mechanical connections including a substantially vertically disposed arm pivotally mounted on the loom, a cam fixed on the crank shaft, follower means on the substantially vertically disposed arm, spring means normally urging the follower means into engagement with the cam, latch means pivoted on the loom and normally resting in engagement with the upper end of said arm to prevent the follower means on said arm from engaging said cam, an extension on said overriding clutch means, a link connecting the extension on said overriding clutch means with said arm and means responsive to said pattern mechanism for moving the latch out of engagement with the upper end of said arm to permit the arm to move with the cam to, in turn, impart movement to the extension on the overriding clutch means through the medium of the link to impart movement to the overriding clutch means, and said cam being operable upon the follower means to effect movement thereof immediately following a relatively short beat-up stroke of the lay so as to slacken the loop warp yarns momentarily to be taken up upon subsequent beat-up strokes of the lay.

5. In a loom for weaving looped fabrics, such as terry fabric and the like, said loom having an oscillatable lay and also having pattern controlled means for causing a relatively short beat-up stroke of the lay at predetermined intervals and also having means for throwing weft yarns across the lay immediately preceding each beat-up stroke thereof, said loom also having an automatic bobbin transfer mechanism for replacing an exhausted bobbin and said bobbin transfer mechanism including a shuttle feeler which moves towards the lay upon the bobbin transfer mechanism being conditioned for a bobbin transfer operation to take place, a revoking latch pivoted on the loom, means normally holding the latch above the path of travel of the shuttle feeler, means automatically operable upon a relatively short beat-up stroke of the loom taking place for releasing said latch to permit the same to move into the path of the shuttle feeler whereby, upon the bobbin transfer mechanism being conditioned for a transfer operation to take place simultaneously with a relatively short beat-up stroke of the lay, the latch will engage and interrupt movement of the shuttle feeler to thus revoke the conditioning of the bobbin transfer mechanism and to prevent a bobbin transfer operation from taking place upon a relatively short beat-up stroke of the lay.

6. In a loom for weaving looped fabrics, such as terry fabrics, said loom having an oscillatable lay and also having pattern controlled means for varying the beat-up stroke of the lay and also having means for throwing a weft yarn across the lay immediately preceding each beat-up stroke thereof, said loom also having at least one temple disposed adjacent one of the selvages of the fabric being woven and at the selvage from which the particular weft yarn extends upon a relatively short beat-up stroke of the lay, improved means for maintaining a weft yarn thrown across the lay in parallel relation to the lay and to a previously beat-up weft yarn upon a stroke of the lay terminating short of the normal beat-up point comprising a pair of quadrants disposed on axes parallel to the axis of the lay and being in engagement with each other and supported by the temple, an extension on one of the quadrants extending into the path of travel of the lay and engageable by the lay upon a beat-up stroke thereof, a vertical pin carried by the other of the quadrants and normally extending adjacent and slightly above the path of travel of the upper surface of the lay for engaging any weft yarns thrown across the lay, whereby upon a beat-up stroke of the lay, the lay will engage the quadrant extension to impart a partial revolution to the corresponding quadrant to, in turn, impart a partial revolution to the other of the quadrants to thereby move the pin carried thereby away from the lay upon a beat-up stroke thereof.

7. In a loom for weaving looped fabrics, such as terry fabrics and the like, said loom having a lay extending transversely thereof and also having swords supporting said lay and also having a driven crank shaft provided with crank throws thereon and also having pitman rods pivotally connected to the throws, a link pivotally connected at one end thereof to each pitman rod and having its other end pivotally connected to the corresponding sword, pattern controlled means for varying the effective combined lengths of said pitman rods and corresponding links so as to vary the corresponding beat-up stroke of the lay comprising spring means normally holding the pivotal connections at the junctures of the pitman rods and the links in substantial alinement with remote ends of the pitman rods and the links, means for swinging the pivotally interconnected ends of the pitman rods and the corresponding links out of alinement with the remote ends of the pitman rods and corresponding links comprising a bell crank pivoted to move with each of the swords, one of the arms of each of said bell cranks being pivotally connected to the pivot of the corresponding link at its connection to the pitman rod, a pitman breaking arm pivotally connected to the other arm of each of said bell cranks, a latch engaging means on each of said pitman breaking arms, a pair of latches pivotally supported on said loom, a pattern mechanism, a resilient mechanical connection between the pattern mechanism and the latches being operable to move said latches into the path of the latch engaging means on the breaking arms as the breaking arms move in unison with the lay to thus cause said bell cranks to, in turn, move about their axes and to swing the pivotally interconnected ends of the pitman rods and the corresponding links out of alinement with the remote ends of the pitman rods and corresponding links upon a beat-up stroke of the lay to thus reduce the present beat-up stroke substantially relatively to a normal beat-up stroke of the lay, an arm pivoted to move in fixed relation to said latches, spaced stop pins carried by the loom and being astride said last-named arm, one of said pins serving to limit movement of the latches into operative position, and another of said pins serving to limit movement of the latches in the opposite direction upon the tension in the resilient connection being relaxed.

8. In a loom for weaving looped fabrics, such as terry fabrics, said loom having a lay and also having at least two swords thereon for supporting the lay and also having a crank shaft disposed rearwardly of the lay and being provided with crank throws thereon and also having a pitman rod pivotally connected at its rear end to each of the crank throws, and said loom also having a driven cam shaft, pattern controlled means for selectively shortening the length of the beat-up stroke of the lay relative to a normal beat-up stroke thereof comprising a link pivotally connected at its rear end to each of said pitman rods and being pivotally connected at its front end to a corresponding sword, first spring means normally holding the pivotal connections at the junctures of the links and the pitman rods in substantial alinement with the points at which the pitman rods are connected to the crank throws and the points at which the links are connected to the swords, a bell crank for each pitman rod having a pair of substantially right-angularly disposed arms thereon, the bell cranks being pivoted on the corresponding swords, one of the arms of each of said bell cranks being pivotally connected to the pivotal connection at the juncture of the corresponding link and pitman rod, a pitman breaking arm pivotally connected to each of the others of said arms of the bell cranks and extending rearwardly therefrom, latch engaging means on each of the pitman breaking arms, a vertically movable latch normally disposed adjacent the path of travel of the latch engaging means on each of said pitman breaking arms upon each normal beat-up stroke of the lay, a pattern mechanism, connections between the pattern mechanism and the latches for selectively moving the latches into the paths of travel of the latch engaging means on said pitman breaking arms for interrupting the forward movement thereof to cause the corresponding bell cranks to pivot about their axes and to thus swing the pivotal connections at the junctures of the links and the pitman rods out of alinement with the remote ends of corresponding links and pitman rods to thus cause the lay to stop short of a normal beat-up stroke, a latch pivot shaft oscillatably mounted on the loom and on which the latches are fixedly mounted, at least one latch actuating arm fixed at its upper end on said pivot shaft and depending therefrom, a pin projecting from at least one side of said latch actuating arm, a cam follower arm pivotally mounted on the loom, a cam fixed on said cam shaft, second spring means normally urging the cam follower arm into engagement with said cam, a link pivotally connected to said follower arm at one end thereof and being provided with a longitudinally extending slot therein at the other end thereof, said longitudinally extending slot being slidably penetrated by the pin on said latch actuating arm and the wall of said slot in the link adjacent the point at which it is pivotally connected to the follower arm being adapted to engage the pin upon the high point of said cam engaging the follower arm to thus swing the latches to inoperative position out of the paths of travel of the latch engaging means on said pitman breaking arms, said slot being provided to permit the second spring means to urge the corresponding cam follower arm in a direction away from said latch actuating arm without moving the latch into operative position.

9. In a loom for weaving looped fabrics, such as terry fabrics, said loom having a lay and also having at least two swords thereon for supporting the lay and also having a crank shaft disposed rearwardly of the lay and being provided with crank throws thereon and also having a pitman rod pivotally connected at its rear end to each of the crank throws, and said loom also having a driven cam shaft, pattern controlled means for selectively shortening the length of the beat-up stroke of the lay relative to a normal beat-up stroke thereof comprising a link pivotally connected at its rear end to each of said pitman rods and being pivotally connected at its front end to a corresponding sword, first spring means normally holding the pivotal connections at the junctures of the links and the pitman rods in substantial alinement with the points at which the pitman rods are connected to the crank throws and the points at which the links are connected to the swords, a bell crank for each pitman rod having a pair of substantially right-angularly disposed arms thereon, the bell cranks being pivoted on the corresponding swords, one of the arms of each of said bell cranks being pivotally connected to the pivotal connection at the juncture of the corresponding link and pitman rod, a pitman breaking arm pivotally connected to each of the others of said arms of the bell cranks and extending rearwardly therefrom, latch engaging means on each of the pitman breaking arms, a vertically movable latch normally disposed adjacent the path of travel of the latch engaging means on each of said pitman breaking arms upon each normal beat-up stroke of the lay, a pattern mechanism, connections between the pattern mechanism and the latches for selectively moving the latches into the paths of travel of the latch engaging means on said pitman breaking arms for interrupting the forward movement thereof to cause the corresponding bell cranks to pivot about their axes and to thus swing the pivotal connections at the junctures of the links and the pitman rods out of alinement with the remote ends of corresponding links and pitman rods to thus cause the lay to stop short of a normal beat-up stroke, a transverse pivot shaft oscillatably carried by the loom and on which the ends of the latches remote from the swords are fixedly mounted, a latch actuating arm fixedly mounted on said shaft, a cam fixed on said cam shaft, a pivoted follower arm carried by the loom and extending adjacent the cam shaft, a link pivotally connected to the free end of the follower arm and having a longitudinally extending slot therein, a pin projecting from one side of the latch actuating arm and being slidably mounted in said slot in the link, second spring means normally urging the follower arm into engagement with the cam and said slot in the link being of such length that the wall thereof adjacent the follower arm will engage the pin on said latch actuating arm to impart movement to the arm to, in turn, transmit a partial revolution to the shaft to thus move the latches out of the paths of travel of the latch engaging means on said breaking arms to permit a normal beat-up stroke of the lay.

10. In a loom for weaving looped fabrics and the like, said loom having base warp yarns and also having an oscillatable lay to which the base warp yarns are directed in a weaving operation and also having means for creating normal tension in the base warp yarns, said loom also having loop warp yarns and means for directing the loop warp yarns to the lay under normal tension, pattern controlled means for selectively causing a shorter than normal beat-up stroke of the lay, coacting pattern controlled means for momentarily slackening the tension in the loop warp yarns immediately following a relatively short beat-up stroke of the lay comprising a loop warp feed control roll extending transversely of the loom and partially around which the loop warp yarns pass in advance of their passing to the lay, a first overriding clutch means associated with the loop warp feed control roll and normally permitting rotation of the roll in the direction of movement of the loop warp yarns thereby as transmitted thereto by the tension in the loop warp yarns as they move with the roll, a pattern mechanism, mechanical connections between the pattern mechanism and the overriding clutch means for imparting movement to the first overriding clutch means which will, in turn, be transmitted to the loop warp feed control roll whereby the loop warp feed control roll will cause the loop warp yarns to be advanced momentarily at a greater than normal rate to relax the tension therein so as to form loops of the slackened loop warp yarns upon the succeeding beat-up strokes of the lay, a second overriding clutch means associated with the loop warp feed control roll and also normally permitting rotation of the loop warp feed control roll in the direction of movement of the loop warp yarns thereby as transmitted thereto by the tension in the loop warp yarns as they move with the roll, said second overriding clutch means including a hub disposed in fixed relation to the loop warp feed control roll and in axial alinement therewith and a housing within which the hub may have sliding rotational movement in one direction, means securing the housing against rotation upon rotation being imparted to the loop warp feed control roll in a direction corresponding to the direction of travel of the loop warp yarns and means locking the hub of the second overriding clutch means relative to the housing thereof upon a tendency of the loop warp feed control roll to rotate in a direction opposite to the direction of travel of the loop warp yarns to thus prevent reverse rotation from being imparted to the loop warp feed control roll.

IVAR O. MOBERG.

References Cited in the file of this patent

UNITED STATES PATENTS

| Number | Name | Date |
|---|---|---|
| 211,814 | Weaver | Jan. 28, 1879 |
| 936,310 | Davidson | Oct. 12, 1909 |
| 1,322,730 | Rhoades | Nov. 25, 1919 |
| 1,657,429 | Brown | Jan. 24, 1928 |
| 2,099,780 | Casteele | Nov. 23, 1937 |
| 2,576,789 | Houghton | Nov. 27, 1951 |

FOREIGN PATENTS

| Number | Country | Date |
|---|---|---|
| 42,443 | Germany | Feb. 13, 1888 |